(12) United States Patent
Warne et al.

(10) Patent No.: US 12,205,494 B2
(45) Date of Patent: Jan. 21, 2025

(54) MOTION GENERATOR

(71) Applicant: DYNISMA LTD., Bristol (GB)

(72) Inventors: Ashley William Hawker Warne, Bristol (GB); Matthew Peter Bell, Bristol (GB); Daniel Charmbury Ward, Bristol (GB)

(73) Assignee: DYNISMA LTD., Bristol (GB)

( * ) Notice: Subject to any disclaimer, the term of this patent is extended or adjusted under 35 U.S.C. 154(b) by 520 days.

(21) Appl. No.: 17/611,313

(22) PCT Filed: May 15, 2020

(86) PCT No.: PCT/EP2020/025225
§ 371 (c)(1),
(2) Date: Nov. 15, 2021

(87) PCT Pub. No.: WO2020/228992
PCT Pub. Date: Nov. 19, 2020

(65) Prior Publication Data
US 2022/0215771 A1 Jul. 7, 2022

(30) Foreign Application Priority Data

May 15, 2019 (GB) ...................................... 1906881
Dec. 18, 2019 (GB) ...................................... 1918748

(51) Int. Cl.
*G09B 9/12* (2006.01)
*G09B 9/05* (2006.01)

(52) U.S. Cl.
CPC ...................................... *G09B 9/05* (2013.01)

(58) Field of Classification Search
CPC ...................................... G09B 9/05; G09B 9/12
See application file for complete search history.

(56) References Cited

U.S. PATENT DOCUMENTS 5,752,834 A 5/1998 Ling
5,919,045 A 7/1999 Tagge et al.
(Continued)

FOREIGN PATENT DOCUMENTS

CN 108786122 A 11/2018
EP 2486558 B1 8/2013
(Continued)

OTHER PUBLICATIONS

International Searching Authority, International Search Report and Written Opinion for International Application No. PCT/EP2020/025225, dated Aug. 17, 2020, (11 pages), European Patent Office, Rijswijk, Netherlands.
(Continued)

*Primary Examiner* — Peter R Egloff
(74) *Attorney, Agent, or Firm* — Alston & Bird LLP

(57) ABSTRACT

According to a first aspect of the invention there is provided a motion generator comprising an effector for applying forces, moments and movements to a payload relative to a surface connected to one or more elongate rigid struts, each strut being connected at one end thereof by a first joint to the effector and being connected at its other end by a second joint to an associated rocker, the rocker having a pivot axis, such that movement of a rocker about the pivot axis leads to movement of the effector, and forces applied to an associated rocker lead to forces being applied to the effector, in which the movement of a rocker and forces applied by the rocker are controlled by an actuator, the actuator being in the form of an elongate belt, cable, rope drive, or linear motor arranged to apply a force to a point on an associated rocker away from the pivot axis of the rocker. According to a second aspect of the invention there is provided a motion generator comprising an effector for applying forces, moments and movements to a payload relative to a surface,
(Continued)

the effector being connected to four, or more elongate rigid struts, each strut being connected at one end thereof by a first joint to the effector and being connected at its other end by a second joint to an associated rocker, the rocker having a pivot axis, such that movement of a rocker leads to movement of the effector, and forces applied to an associated rocker lead to forces being applied to the effector, in which the movement of a rocker and forces applied by the rocker are controlled by an actuator, the actuator being arranged to apply a force to a point on an associated rocker away from the pivot axis of the rocker. The invention also relates to motion systems, and driving simulators including such motion generators, and to methods using such motion generators and systems.

31 Claims, 19 Drawing Sheets

(56) References Cited

U.S. PATENT DOCUMENTS

| | | | | |
|---|---|---|---|---|
| 7,172,385 | B2* | 2/2007 | Khajepour | B25J 9/0078 |
| | | | | 901/29 |
| 2007/0059668 | A1* | 3/2007 | Mallaci | G09B 9/02 |
| | | | | 434/29 |
| 2015/0356878 | A1* | 12/2015 | Warmerdam | G09B 9/00 |
| | | | | 73/865.6 |
| 2017/0053548 | A1 | 2/2017 | Warne | |
| 2018/0096622 | A1* | 4/2018 | Glover | G09B 9/048 |
| 2018/0233062 | A1 | 8/2018 | Vatcher et al. | |

FOREIGN PATENT DOCUMENTS

| | | | |
|---|---|---|---|
| EP | 2810268 | A1 | 12/2014 |
| JP | 200097306 | A | 4/2000 |
| JP | 2006275121 | A | 10/2006 |
| JP | 2011021681 | A | 2/2011 |
| JP | 6212054 | B2 | 10/2017 |
| KR | 101146947 | B1 | 5/2012 |
| WO | WO 2013/114179 | A1 | 8/2013 |

OTHER PUBLICATIONS

Informal Comments On Written OPinion for International Application No. PCT/EP2020/025225, dated Oct. 6, 2020, (3 pages).
Japanese Office Action for Japanese Patent Application No. 2021-568076, dated Mar. 26, 2024, 17 pages.
Korean Office Action for Korean Application No. 7039382, dated Nov. 15, 2024, 36 pages.

* cited by examiner

MOTION GENERATOR

CROSS REFERENCE TO RELATED APPLICATIONS

This application is a National Stage Application, filed under 35 U.S.C. § 371, of International Application No. PCT/EP2020/025225, filed May 15, 2020, which internationally claims priority to and the benefit of United Kingdom Application Nos. 1906881.6, filed May 15, 2019, and 1918748.3, filed Dec. 18, 2019; the contents of both of which as are hereby incorporated by reference in their entireties.

BACKGROUND

Related Field

This invention relates to the field of motion systems especially for simulating motion such as driving or flying. In particular, though not exclusively, the invention relates to motion generators, and to motion systems including such motion generators, and to methods of using motion generators, and motion systems for example for use as driving simulators, and to methods for their production.

Description of Related Art

A motion generator is a device capable of applying movements, forces and accelerations to a payload in one or more directions or degrees of freedom. The payload can be, for example, a human undergoing a simulated experience in a motion simulator incorporating a motion generator. Alternatively, the payload may also be a further motion generator which is said to be in series with the first motion generator. Motion generators are used in motion systems. Motion systems include a control system for controlling the motion generator.

Motion systems are used in motion simulators. Motion systems are used in a variety of applications, including motion simulation (for example, flight simulators, vehicle and driving simulators), robotics, 3D printing, vibration and seismic simulation. The most common type of motion system currently used in motion simulation is the Stewart platform (or "hexapod") motion generator. This is a type of parallel manipulator that has six actuators, normally attached in pairs to three positions on the base of a platform and crossing over to three mounting points on a platform, or top plate (or "end effector"). Devices or payloads such as a human user placed on the platform, usually in some form of cockpit, driver area or model vehicle, can be moved in the six degrees of freedom in which it is possible for a freely-suspended body to move, i.e. the three linear movements x, y, z (lateral, longitudinal and vertical), and the three rotations (pitch, roll and yaw). Generally speaking, in a parallel manipulator, several computer-controlled actuators are arranged to operate in parallel to support the payload. In this context "parallel" means that only one actuator exists in each separate load path between the payload and the base, whereas in a series manipulator, one or more of the possible load paths between the payload and the base includes at least two actuators.

A motion simulator is a simulation system incorporating at least one motion generator that can create, for an occupant, the effects or feelings of being in a moving vehicle. Motion simulators are used, professionally, for training drivers and pilots in the form of driving simulators and flight simulators respectively. They also are used, industrially, in the creation, design, and testing of the vehicles themselves, as well as in the design of vehicle components. Professional motion simulators used for driving and flying simulation typically synchronise a visual display—provided for example by a projection system and associated screens and audio signals with the movement of a carriage (or chassis) occupied by the driver or pilot in order to provide a better sensation of the effect of moving. The advent of virtual reality (VR) head-mounted displays (HMDs) makes the aspect of an immersive simulation less costly with current motion systems and has the ability to deliver virtual reality applications to leisure uses such as in passive amusement park or arcade driving, riding-first-person, or flying rides and in active gaming, where one or more players has some control over the driving, riding, flying or first-person game experience. The payload of a motion generator used in motion simulation—for example a chassis or cockpit—is relatively heavy often being of the order of 100's of kg. Motion simulation applications for motion generators require the precise control of such relatively heavy payloads over significant movements, often being of the order of 1 metre or more.

The type of hexapods typically used for motion simulation for human participants typically have a relatively low bandwidth of up to about 20 Hz. This means that they can create oscillatory movements and vibrations of a consistent amplitude, with a frequency of up to 20 times per second, beyond which the amplitude of the movements reduces as the frequency increases. This is sufficient for replicating most car suspension movements, but it does not transmit the frequency content associated with vibrations from the car engine, tyre vibrations, road noise, and the sharp-edged kerbs on racetracks. A low bandwidth also means the signals are delayed, meaning that the driver cannot respond as quickly.

Current motion systems, especially those intended for high-end use such as in military and commercial flight instruction and training applications, are typically very large, heavy, complex, and very expensive. Their complexity necessitates extensive programming and maintenance, further increasing the cost to users.

Dedicated driving simulator motion systems have been developed by the likes of McLaren/MTS Williams/ABD and Ansible, but these tend to be extremely mechanically complex, and therefore expensive, featuring precision machined custom components and often expensive linear motors. These dedicated driving simulator motion systems are more responsive than hexapods when moving in some directions but are still limited in others. The use of ball screws in such systems is disadvantageous in that, whilst good at establishing position, they inhibit force transfer and can only achieve a lower bandwidth. This results in a less natural motion simulation experience for a human user.

The motion simulator disclosed in EP2486558, comprises a mechanism that uses a three degree of freedom parallel manipulator comprising three upright arms driven by bell cranks to control movement in pitch, heave and roll, and therefore is responsive and has high bandwidth in those degrees of freedom. A rotary table driven in rotation by a linear actuator is required to provide yaw. The motion simulator is intended to be relatively compact. However, its horizontal degrees of freedom are provided by series manipulators which introduce compliance, inertia, and friction which limits the responsiveness and bandwidth of the system in the horizontal degrees of freedom.

U.S. Pat. No. 5,919,045 discloses an interactive racing car simulator, including a primary motion generator comprising a simple arrangement of overlaying rectangular frames arranged to move in the X and Y directions respectively on linear guides, under pneumatic control, and termed the "X and Y frames". Whilst the simple arrangement of frames of the type disclosed in this document provides good excursions in the X and Y directions, as the frames are stacked above each other in the motion generator is not especially compact in the vertical dimension. Furthermore, the movements in the X and Y directions are not especially precise, and also the simulator would have a relatively low bandwidth.

An example of a primary motion generator for use in a driving simulator is given in EP2810268A which discloses a three degree of freedom motion generator in series with a six degrees of freedom motion generator which can sustain large movements in the horizontal plane using the primary motion generator, while simultaneously achieving the maximum vertical travel of the secondary motion generator. Therefore, the two motion generators in series can achieve combinations of movements in different degrees of freedom which are impossible with a similarly sized hexapod. However, the hexapod described in this document uses linear actuators and specifically recirculating ball screw-driven linear actuators. As noted above, recirculating ball screw actuators have considerable friction, and so lead to poor responsiveness and bandwidth. The use of other linear actuators in a hexapod architecture leads to further problems. In the case that the linear actuator is mobile as part of the moving strut then it has high moving mass which leads to mechanical resonance at low frequencies, limiting system responsiveness and bandwidth. In the case that the linear actuator is fixed relative to a base, and one end of the hexapod strut translates along the linear actuator, then the weight and inertial loads of the system are reacted by a linear bearing which again involves considerable friction.

US2017/0053548A discloses a motion system including a cable/actuator-controlled platform which is slidable on a large low friction fixed base, and which allows for significant horizontal movement of the platform. The cables and actuators are disposed around the periphery of the large base, allowing the significant horizontal movement of the platform. A hexapod-based secondary motion generator is in turn mounted on the platform and supports a model cockpit in order to provide further movement of the cockpit.

An object of the present invention is to provide an improved motion generator, especially one which is useful for driving and vehicle motion-type simulation applications, and improved motion systems incorporating such motion generators, which are again especially suitable for those applications.

BRIEF SUMMARY

According to a first aspect of the invention there is provided a motion generator comprising an effector for applying forces, moments and movements to a payload relative to a surface, the effector being connected to one or more elongate rigid struts, each strut being connected at one end thereof by a first joint to the effector and being connected at its other end by a second joint to an associated rocker (i.e. the rocker to which a particular strut is connected), the rocker having a pivot axis such that movement of a rocker about the pivot axis leads to movement of the effector, and forces applied to a rocker lead to forces being applied to the effector, in which the movement of a rocker and forces applied by the rocker are controlled by an actuator, the actuator being in the form of an elongate belt, cable, rope drive, or linear motor arranged to apply a force to a point on the rocker away from the pivot axis of the rocker.

According to a second aspect of the invention there is provided a motion generator comprising an effector for applying forces, moments and movements to a payload relative to a surface, the effector being connected to four or more elongate rigid struts, each strut being connected at one end thereof by a first joint to the effector and being connected at its other end by a second joint to an associated rocker (i.e. the rocker to which a particular strut is connected), the rocker having a pivot axis, such that movement of the rocker leads to movement of the effector, and forces applied to the rocker lead to forces being applied to the effector, in which the movement of a rocker and forces applied by the rocker are controlled by an actuator, the actuator being arranged to apply a force to a point on the rocker away from the pivot axis of the rocker.

The surface may be generally planar. For example, in many applications the surface may be the floor of a building in which the motion generator according to either aspect of the invention is installed, but it could be a baseplate for the motion generator. In other situations, such as the combinations described below and where the secondary motion generator is a motion generator in accordance with the invention, the surface may be a reference plane above the physical surface on which the combination is installed, typically provided by or defined by the primary motion generator and that surface may move with the primary motion generator.

In this context, a rocker conventionally means a solid body being attached to one end of an elongate revolute joint or pivot, the body being able to rotate about a pivot axis provided by this joint or pivot, thereby rotating relative to another solid body attached to the other end of the joint. The rocker will typically also have other joints and pickup points on its body, attached to other moving elements. Rockers are typically used in mechanical systems to control relative motions of moving elements, controlling mechanical advantages, and to change directions of motion. Mechanical elements such as bell cranks and levers are forms of rockers. For example, rockers are often used in car suspension e.g. in pushrod or pull-rod suspension arrangements. The term "rocker" also embraces for the purposes of this disclosure a solid body attached to or integral with a flexure, such that the body is able to describe an arc about an imaginary axis generally extending upwards at a midpoint on the flexure, that imaginary axis being equivalent to a pivot axis as referred to above for other rockers.

Thus, the invention provides a motion generator in the form of a parallel manipulator with one, two, three, four, five or preferably six degrees of freedom comprising one, two, three, four or more, typically six, actuators each capable of producing responsive and high bandwidth movements. The motion generators of this invention are therefore able to provide responsive and high bandwidth motion in all six degrees of freedom.

A motion generator in accordance with either aspect of the invention may be advantageous in some or all of several respects compared with known motion generators. It may have low levels of friction within its moving parts. The motion generator design of the invention minimises friction, and therefore is responsive and has high bandwidth because the weight and loads imparted upon the payload are reacted by a rocker (typically along with its rotary bearings) which have less friction than linear bearings or linear guides used in conventional designs. It may have low inertia due to the lower mass of moving elements compared with known designs. It may have high bandwidth typically better than 50 Hz, in more than one degree of freedom. In some embodiments it may have significantly higher bandwidth than 50 Hz in multiple degrees of freedom, for example 80 Hz, 90 Hz, or 100 Hz or more which is a significant advance over comparably priced motion generator designs. Another advantage of a motion generator in accordance with the invention is that it may be relatively compact in the vertical direction compared to certain current motion generator designs. Furthermore, it does not require, for example, the precision-machined metal base required by the motion generator of EP2810268A as it may be installed on a conventional building floor.

The first and second joints in a motion generator of the invention may together have a total number of degrees of freedom which is at least five. One of the first or second joints may include a universal, cardan, spherical joint, or flexure, while the other may be a spherical joint.

A motion generator in accordance with either aspect of the invention typically comprises a plurality of rockers. In most arrangements, the motion generator may comprise six rockers. The pivot axis of at least one, preferably each, rocker may be fixed relative to the surface where the surface is a physical surface on which the motion generator is installed. Alternatively, (typically in the context of a combination including a motion generator in accordance with the invention mounted as a secondary motion generator on a primary motion generator), the pivot axis of the rocker may not be fixed relative to that surface, but is fixed relative to a plane above the physical surface, that plane moving with the primary motion generator. The rocker pivot could be a revolute joint, an axle with bearings, or a flexure. Each rocker may move parallel with the surface. Alternatively, at least one, preferably each, rocker may be inclined at an angle of greater than zero degrees to the surface. For example, at least one, preferably each rocker may rotate about a pivot axis inclined from 0 to 90°, preferably about 45 degrees (for example 40 to 50 degrees) to the surface. Some or all of the rockers may form an obtuse angle with their connected strut. This may reduce resonance in the motion generator. Additionally, or alternatively, this may make the motion generator more compact.

A motion generator according to either aspect of the invention may typically comprise 4, 5, 6 or more elongate struts. For example, the motion generator may comprise X elongate struts, where X is less than six, and at least one mechanical constraint means which constrains Y degrees of freedom of the effector where Y=6−X. Alternatively there could be more than 6 elongate struts. Pairs of elongate struts may be arranged on opposing sides of the effector. In one typical embodiment, a motion generator comprises three pairs of elongate struts.

At least one actuator may be arranged so that it can react the load back to the surface. The actuator may be, for example, an elongate actuator such as a belt, cable or rope drive, or linear motor. Each form of actuator may have its own advantages. For example, belt, cable or rope drive actuators may be relatively less expensive. Where the actuator is a linear motor it may be connected via a linkage to an associated rocker.

Where the motion generator is powered by an actuator such as an elongate belt, cable or rope drive, the elongate belt, cable or rope drive may be actuated by a pulley or capstan. Such a pulley or capstan may be driven by an electric motor or gearmotor.

Where the actuator includes a belt, cable or rope drive, both the ends of the belt, cable or rope drive may be attached to an associated rocker, forming a closed loop in the belt, cable or rope between two attachment points on the rocker. A passive tensioning device including a pulley may be applied to one end of, or portion of, the closed belt, cable or rope drive to maintain tension in the belt, cable or rope drive and to accommodate its fixed length within the changing geometry of the system. The passive tensioning device including a pulley may accommodate a change in geometry of the rocker. The other end of, or another portion of, the belt, cable or rope drive may be attached to a passive force application device which maintains tension in the belt, cable or rope. The passive force application device in this case may be, for example, a spring, gas strut, or bungee.

In a motion generator according to either aspect of the invention, a passive force application device may be connected to a rocker so as to provide assistance to the actuator such as static preload or damping, or to support the weight of the payload. This assistance could be provided by a passive force application device such as a spring, gas strut or bungee.

One or more passive force application device such as a spring, gas strut, bungee may be connected to the effector or the payload to provide further or alternative assistance such as static preload or damping to the actuator.

At least one rocker and/or actuator may be mounted on or to the surface. Alternatively, or additionally, at least one rocker and/or actuator may be mounted on a frame or other support fixed to the surface.

The payload supported by the effector may be more than 10 kg, preferably more than 80 kg, preferably more than 250 kg, or preferably more than 500 kg. Typically, in motion simulation applications, the payload may be a vehicle chassis or cockpit or a model thereof.

A motion generator according to either aspect of the invention may be arranged to operate as a secondary motion generator in series with a primary motion generator. Such a combination arrangement comprising a primary and secondary motion generator, may provide a user with a greater range of motion for a payload. For example, the combination may the achieve excursions of the order of 1 metre required in motion, especially vehicle, simulation applications. Furthermore, such a combination arrangement may permit the use of a relatively simple, and therefore cost-effective, primary motion generator providing motion for example in the X and Y directions only with the secondary motion generator providing more complex motions. Alternatively, the primary motion generator could have X, Y and yaw degrees of freedom. One example of a known motion generator suitable for use as a primary motion generator, with a motion generator in accordance with the invention as a secondary motion generator is that disclosed in US2017/0053548. In such a combination, a motion generator according to the invention is arranged as a secondary motion generator in which at least one rocker and or actuator of that generator is mounted on a frame, the end effector of, or as the payload of, the primary motion generator. For example, the primary motion generator may include a frame, or platform, as end effector and at least one rocker of the secondary motion generator may be pivotally mounted to the frame of the primary motion generator.

According to another aspect of the invention there is provided a motion system, the motion system comprising at least one motion generator according to either aspect of the invention, and a control system. The control system may control the operation of at least one motion generator actuator, preferably that of all actuators. The control system may compute the positions, accelerations and/or forces required to be produced at each actuator in order to generate a demanded motion profile.

According to another aspect of the invention there is provided a driving or vehicle simulator including a motion generator according to either aspect of the invention or a motion system according to the invention, and at least one environment simulation means selected from visual projection, or display means, and audio means. The driving or vehicle simulator may comprise a cockpit or chassis and/or vehicle simulation element. The driving or vehicle simulator may include means for simulating an environment comprising at least one of display apparatus, virtual reality apparatus, projection apparatus, and software means for modelling a virtual environment, and a vehicle model.

Another aspect of the invention provides a method of producing a motion system comprising producing or providing a motion generator according to either aspect of the invention and connecting the control system to the motion generator.

Other features of the motion generators, motion systems, and driving simulators will be apparent from the description and further claims. Where reference is made to apparatus such as motion generators, motion systems, motion simulators and certain aspects or embodiments of the invention, the skilled addressee will appreciate that other aspects and embodiments of the invention may equally apply to such apparatus. References to such apparatus being in accordance with the invention may refer to any aspect of the invention.

BRIEF DESCRIPTION OF THE FIGURES

Motion generators, motion systems, and driving simulators and their operation and production in accordance with the invention will now be described, by way of example only, with reference to the accompanying drawings, FIGS. 1 to 28, in which.

Figure 1:
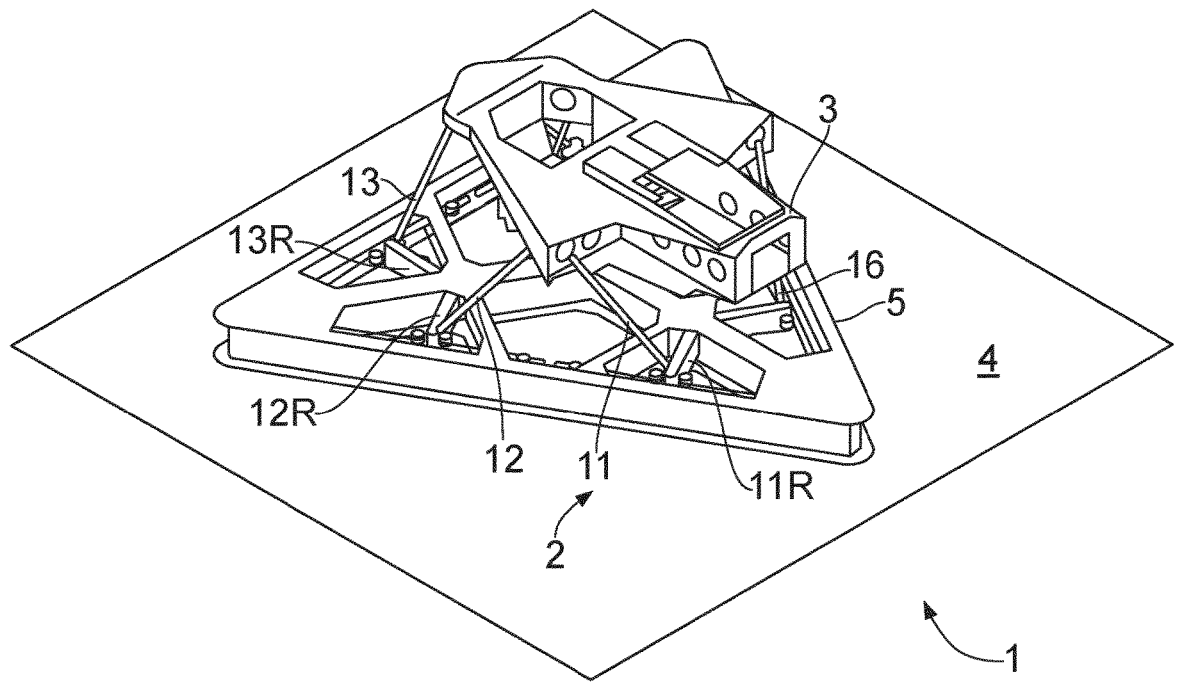
FIG. 1 is a schematic perspective view of a motion system in accordance with the invention, from above and one side.

References in this specification to particular orientations and positions, such as upper or lower refer to those orientations or positions as shown in the accompanying drawing.

DETAILED DESCRIPTION OF VARIOUS EMBODIMENTS

Motion System Including a Motion Generator

A motion system 1 including a motion generator 2 in accordance with a first aspect of the invention is shown in FIGS. 1 to 19. The motion system 1 comprises a motion generator 2 mounted on a surface 4, and supports a vehicle chassis 3, which, in this embodiment, constitutes the payload of the motion generator 2, and control means (for example as described in relation to FIG. 26) above a frame 5. The frame 5 has a generally triangular shape and is constructed of a lightweight rigid material such as aluminium. Other shapes and types of frames, such as space frames, and other materials are contemplated for use in such frames. In the embodiment shown, the chassis 3 is a replica of a racing car cockpit. The chassis 3 is supported by pairs of elongate rigid rods or struts, 11, 12; 13, 14; and 15, 16 which at their upper ends are connected by upper joints 11 UJ, 12 UJ, 13 UJ, 14 UJ, 15 UJ, and 16 UJ respectively to the chassis 3. The elongate rigid rods 11-16 may be made, for example, of carbon fibre to reduce resonance. The upper joints 11UJ-16UJ may be spherical, cardan, or universal joints, and/or may comprise flexures. The lower end of each elongate rod 11-16 is connected by a lower joint 11LJ, 12LJ, 13LJ, 14LJ, 15LJ, and 16LJ respectively to an associated rocker 11R, 12R, 13R, 14R, 15R, and 16R, respectively which are arranged for pivotal movement on the inside of the triangular frame 5 of the motion generator 2. The lower joints 11 LJ-16 LJ may also be spherical, cardan or universal joints, and/or may comprise flexures. Linear actuators 11LA-16 LA which may be, for example, belt drives, linear motors (a suitable example of which would be an I-Force Ironless Linear Motor by Parker) or ball screw-driven actuators (a suitable example of which would be a PC Series Actuator by Thomson driven by an AKM2G Servo Motor by Kollmorgan). Belt drives are preferred. The connection between the rockers 11 R-16R and the linear actuators 11 LA-16 LA is shown in more detail in FIGS. 4-7.

It is contemplated that a motion generator in accordance with the invention may not include a frame 5. In such an arrangement, at least some of, or all, the rockers and/or actuators could be mounted directly on the surface 4 rather than to a frame. Such a motion generator may be advantageous in that the surface may be more rigid than the frame. The frame has the advantage that it can be used to carry the entire the motion generator, particularly when it is used as a secondary motion generator in series with a primary motion generator.

Figure 4:
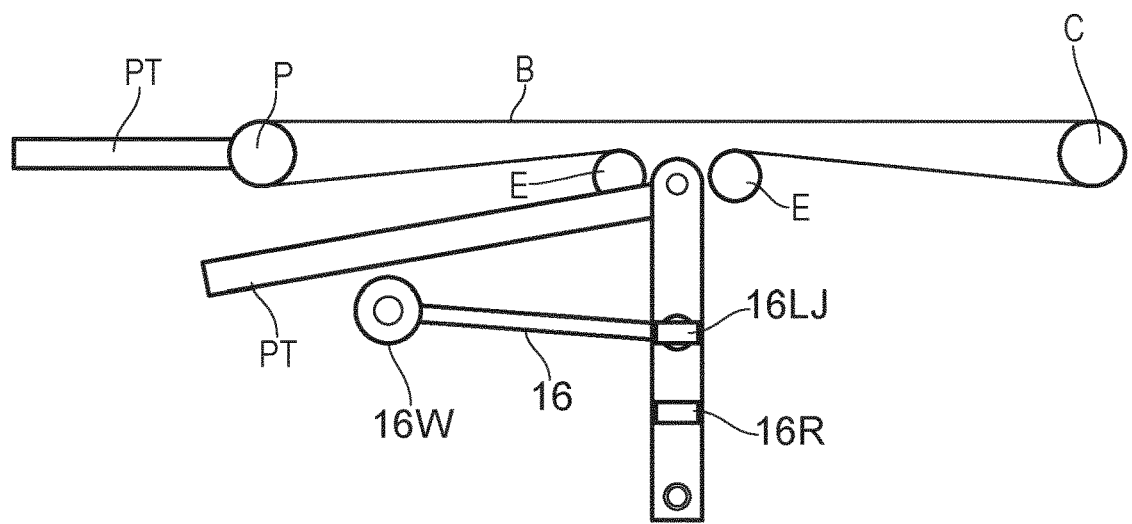
FIG. 4 is a schematic detailed plan view of a rocker of the motion system of FIG. 1.
Figure 5:
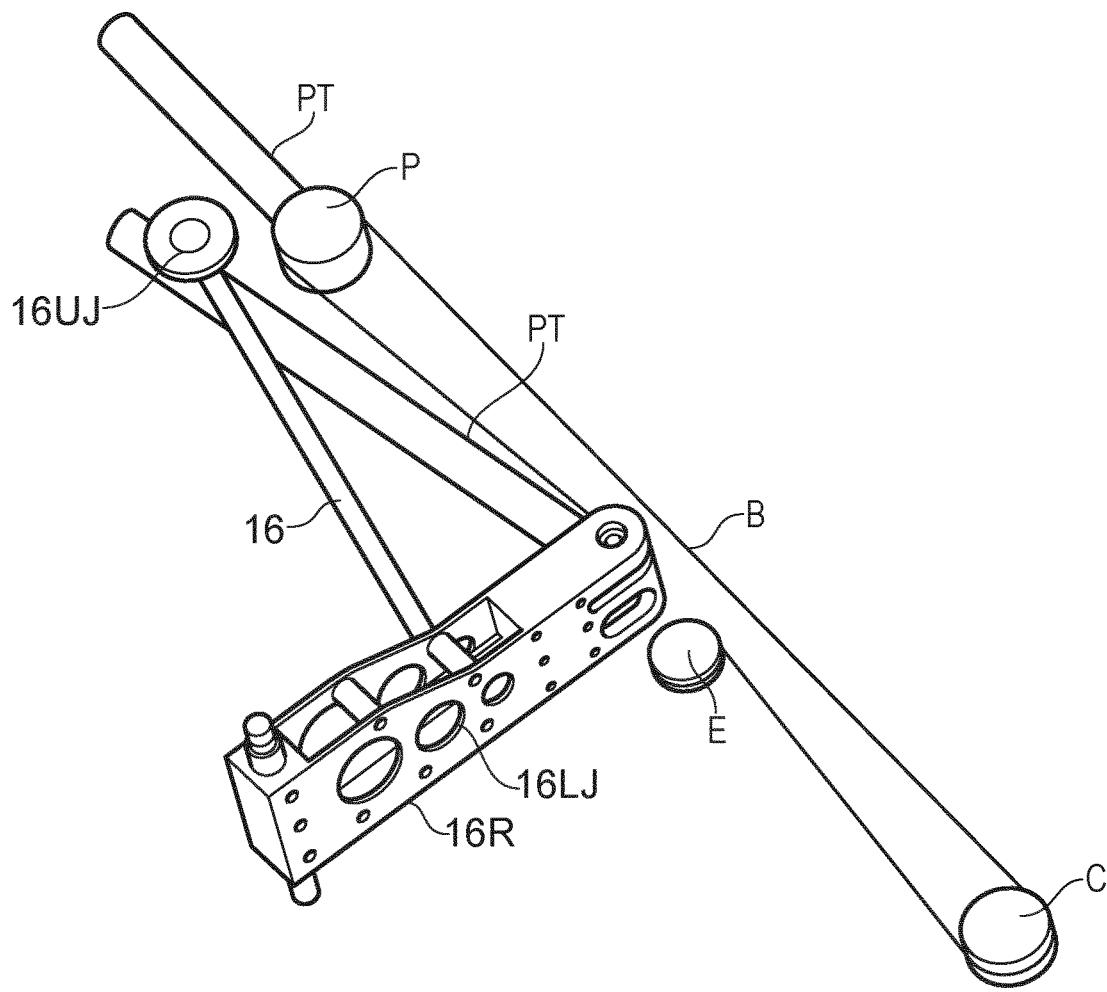
FIG. 5 is a schematic perspective view of the rocker shown in FIG. 4.
Figure 6:
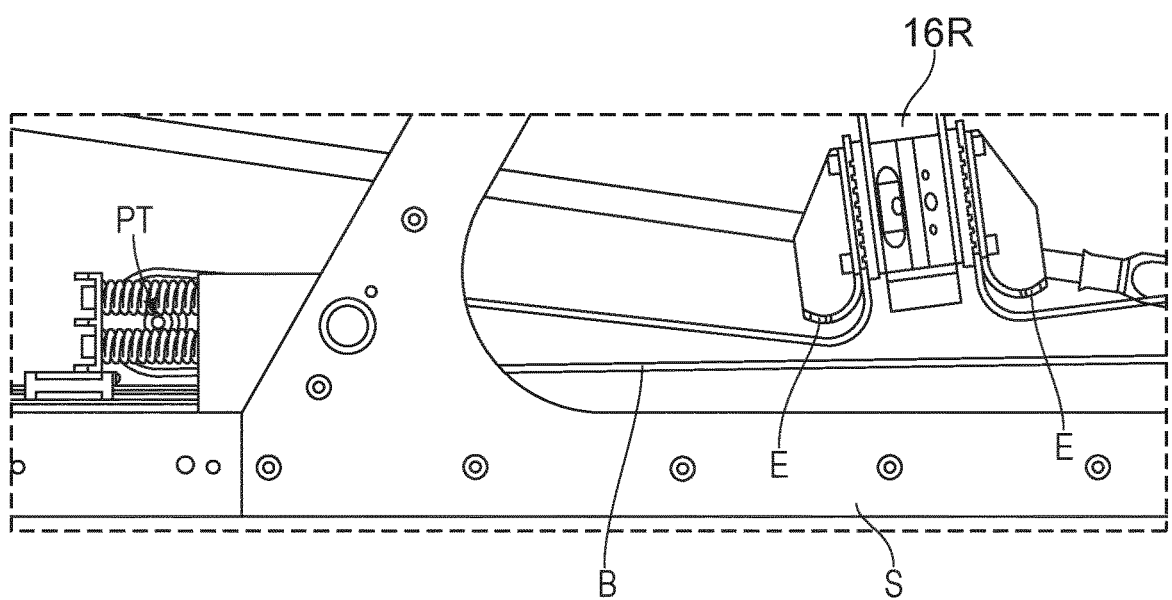
FIG. 6 is a detailed plan view of a different rocker for use in a motion generator in accordance with the invention.
Figure 7:
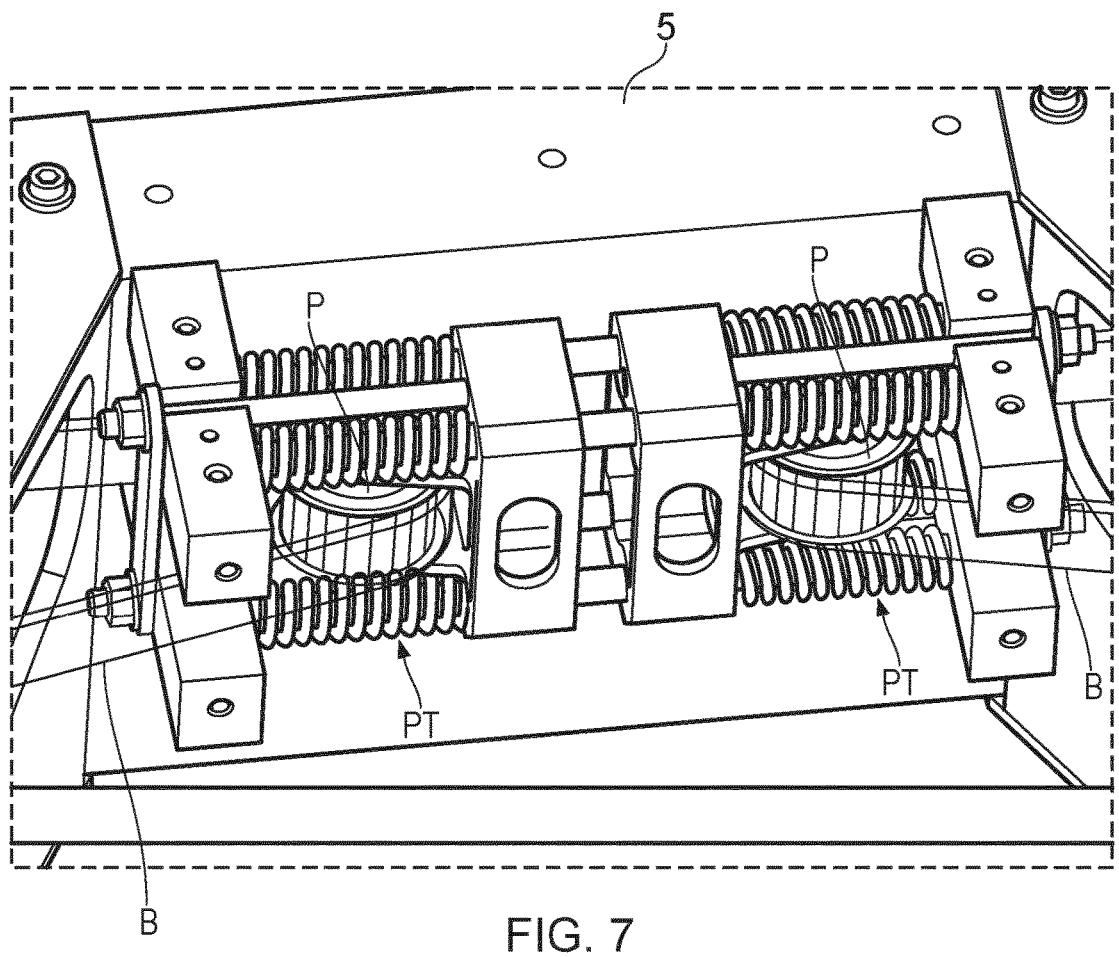
FIG. 7 is a detailed view of passive tension devices of a motion generator in accordance with the invention.

FIGS. 4 and 5 show rocker 16R and connected elements in more detail. The continuous toothed belt B connects with the rocker 16R via rounded elements E which reduce wear on the connected belt B. An example of a suitable toothed belt is a Conti® Synchrochain Carbon belt made by Continental. In FIGS. 4 and 5, the elements E are circular. In FIG. 6, the corresponding elements E are curved. It should be noted that the belt B shown in FIG. 6 is spaced away from the curved elements simply for clarity, in practice the belt will closely fit to the curved elements. The toothed belts B pass around drivable correspondingly toothed electrically powered capstans (indicated as "C"). A suitable example of an electrically-powered capstan would be a synchronous belt sprocket by Martin, driven by an AKM2G Servo Motor by Kollmorgan. The capstans C operate under the control of a control system (for example as described in relation to FIG. 26).

It will also be noted that the passive tension elements P in the embodiment of FIGS. 4 and 5 are bungees or springs. In the embodiment shown in FIGS. 6 and 7, the passive tension elements are compression springs. The belt B passes round freely rotating pulleys marked as P which are tensioned by the passive tensioning devices PT which provide a preload tension on a connected rocker 11R-16R against the belt B connected to that rocker. By movement of one or more of the rockers 11R-16R driven by the associated belts B and capstans C under the control of the control system, the rods or struts 11-16 move the chassis 4, at high bandwidth in any of six degrees of freedom into a wide variety of conditions, some of which are described below.

The motion generator 2, is particularly compact in a vertical direction. This compactness is advantageous when the motion generator is included in a motion system used in driving simulators.

In the following description, the position of the rockers 11 R-16R in use is described in more detail. For simplicity, only the position of the rockers 11 R-16 R is described, and those rockers identified in the drawings with other elements unnumbered in some drawings. It will be appreciated by the skilled addressee that the other elements, such as the elongate struts 11-16, belt drives, and connected passive tension devices will also be affected by movement of the rockets but this is not described in detail in the description below in relation to FIGS. 1 to 3 and 7-17.

Figure 2:
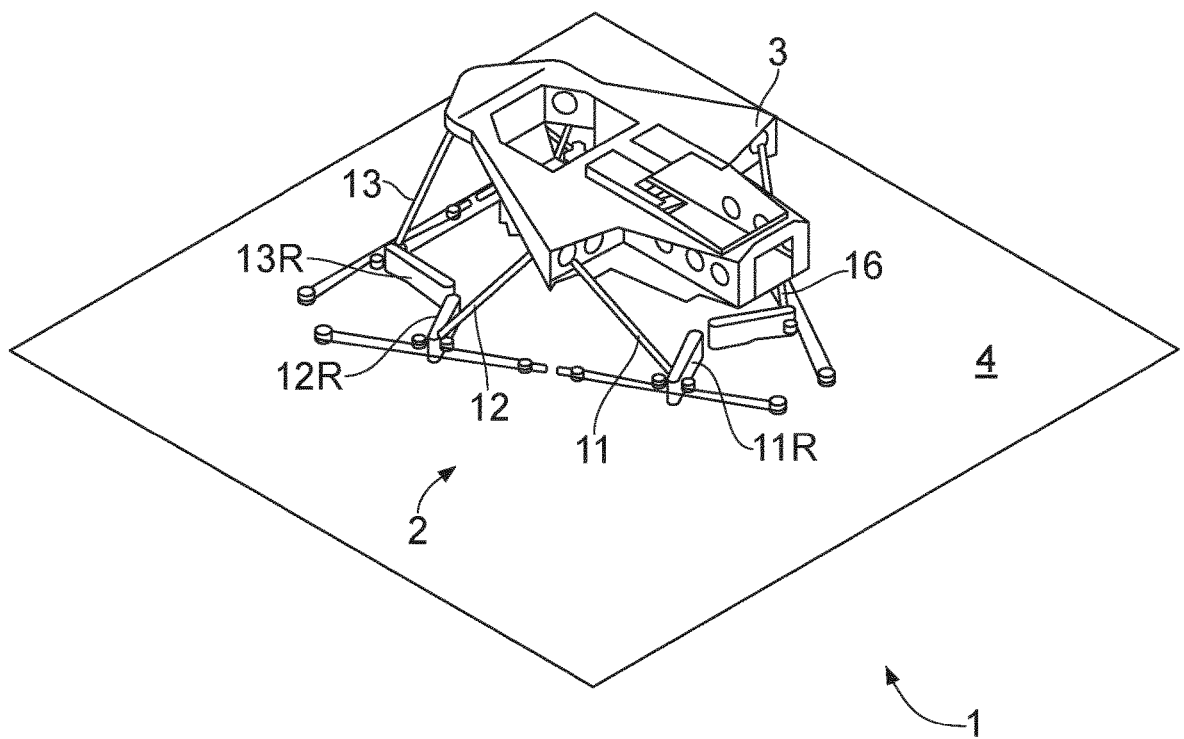
FIG. 2 is a schematic perspective view of the motion system of FIG. 1 with the frame removed for clarity.
Figure 3:
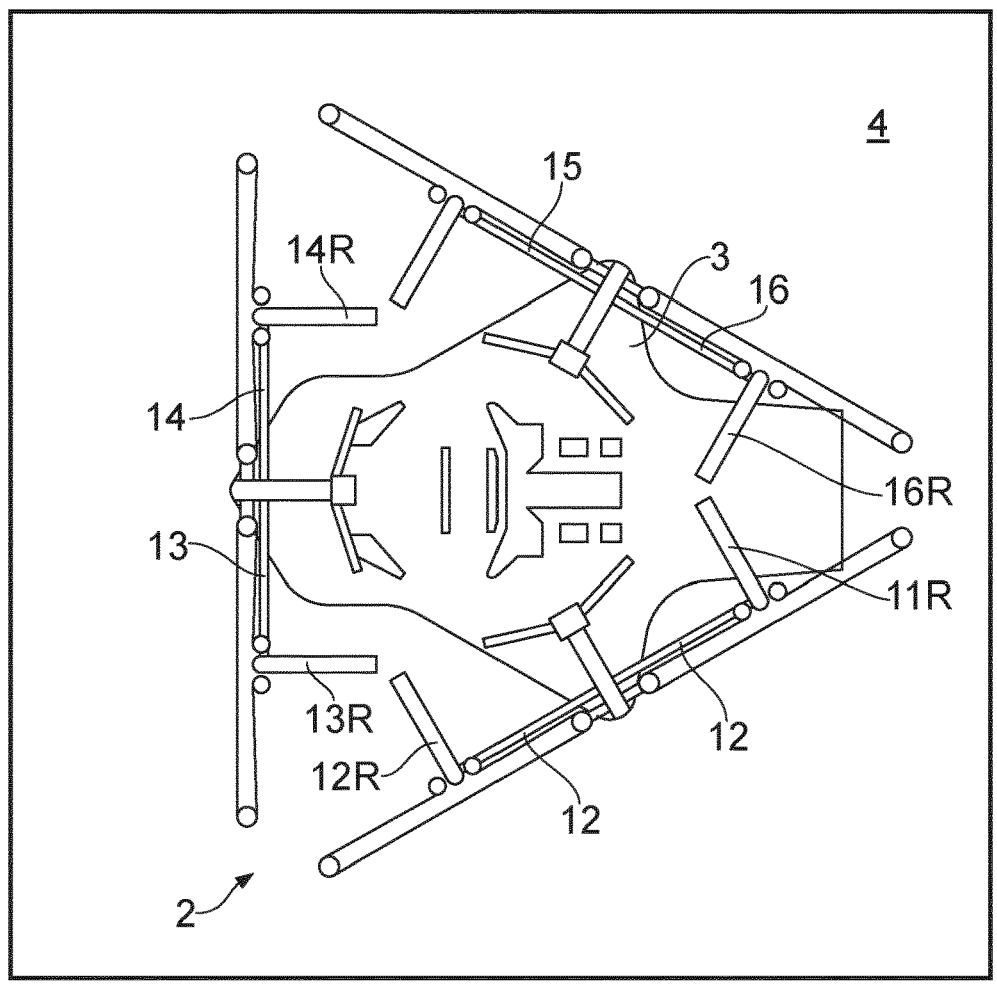
FIG. 3 is a plan view of the motion system as shown in FIG. 2.

The motion generator 2 is shown with the chassis 3 in a neutral condition in FIGS. 1 to 3. In this condition, the state of the rockers is as follows:

| Rocker | Position from below |
|---|---|
| 11R | Neutral |
| 12R | Neutral |
| 13R | Neutral |
| 14R | Neutral |
| 15R | Neutral |
| 16R | Neutral |

Figure 8:
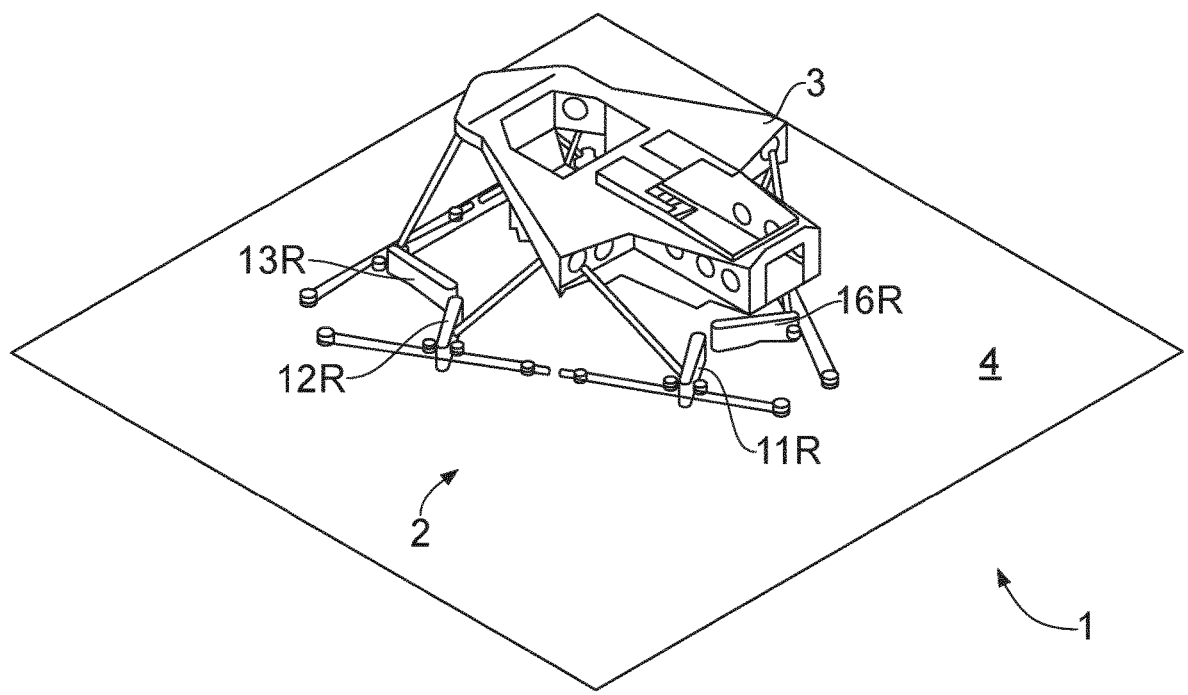
FIG. 8 is a perspective view of the motion system as shown in FIG. 2 in a surge forward condition.
Figure 9:
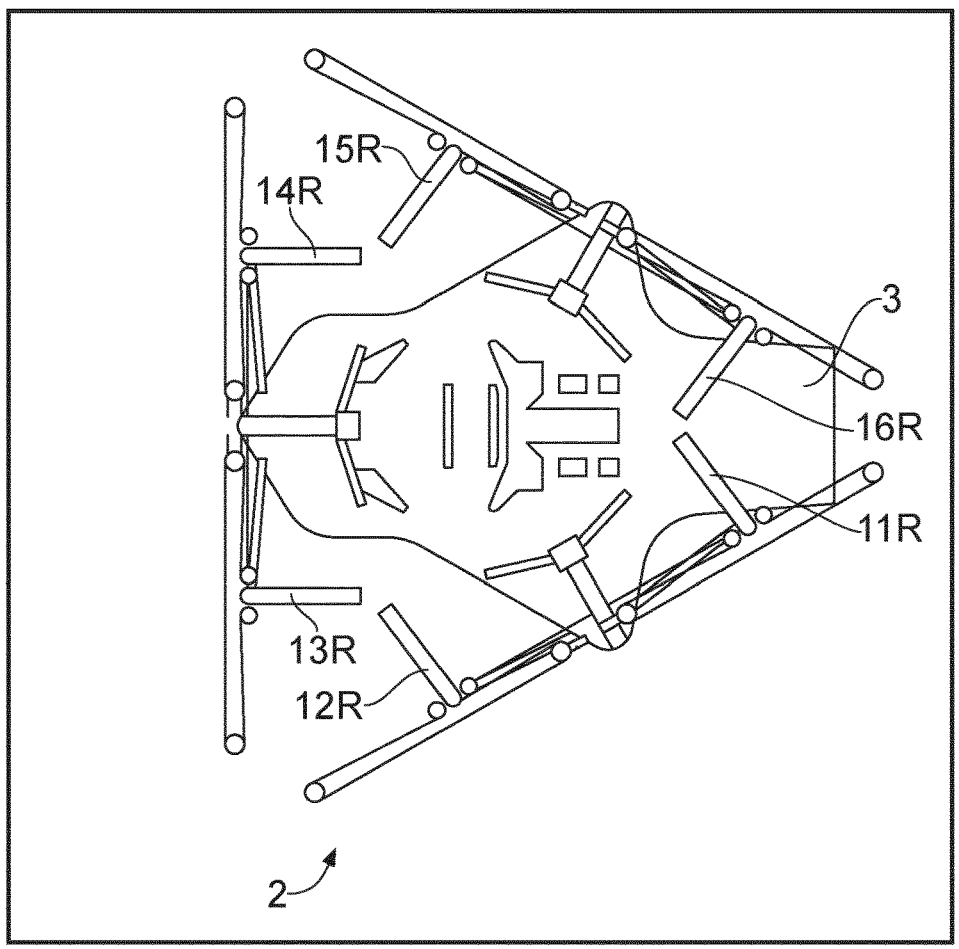
FIG. 9 is a plan view from below of the motion system in the surge forward condition of FIG. 8.

The motion generator is shown with the chassis 3 in a surge forward condition in FIGS. 8 and 9. In this condition, the states of the rockers is as follows:

| Rocker | Position from below |
|---|---|
| 11R | Anti-clockwise |
| 12R | Anti-clockwise |
| 13R | NEUTRAL |
| 14R | Neutral |
| 15R | CLOCKWISE |
| 16R | CLOCKWISE |

Figure 10:
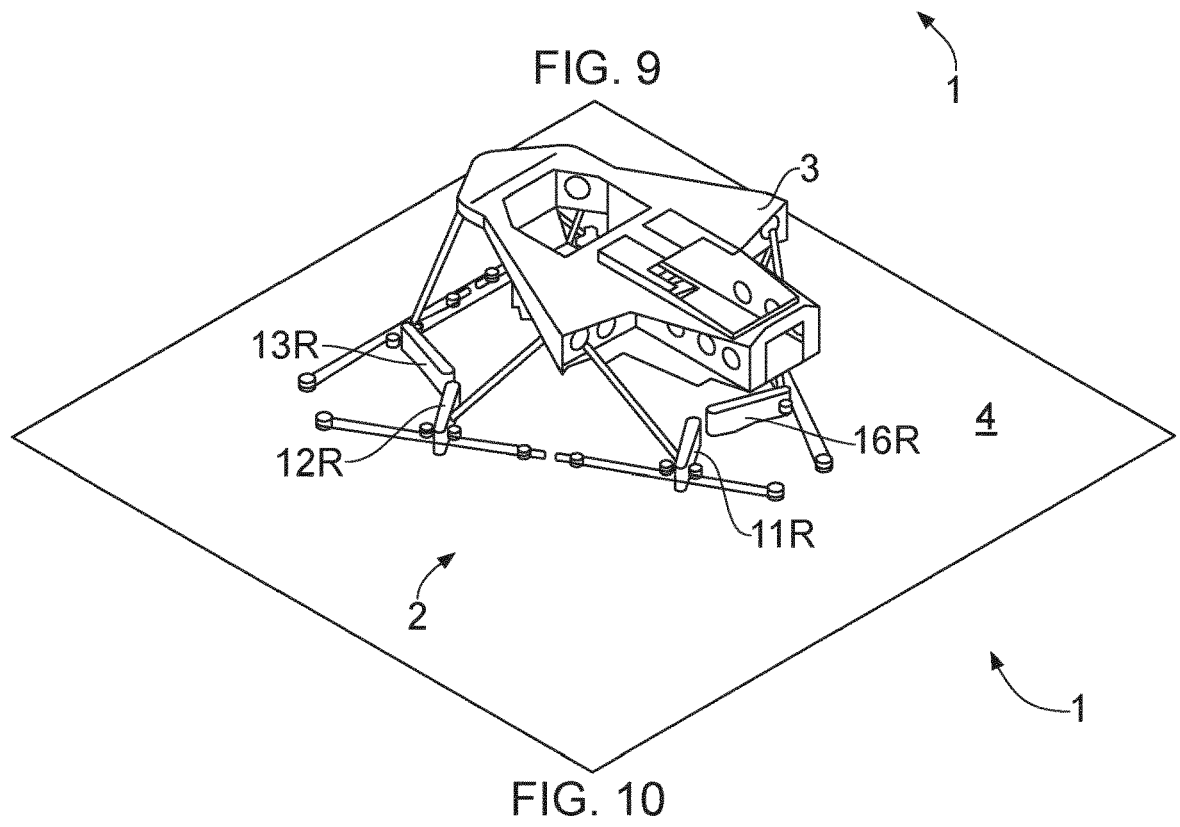
FIG. 10 is a perspective view of the motion system as shown in FIG. 2 in a sway left condition.
Figure 11:
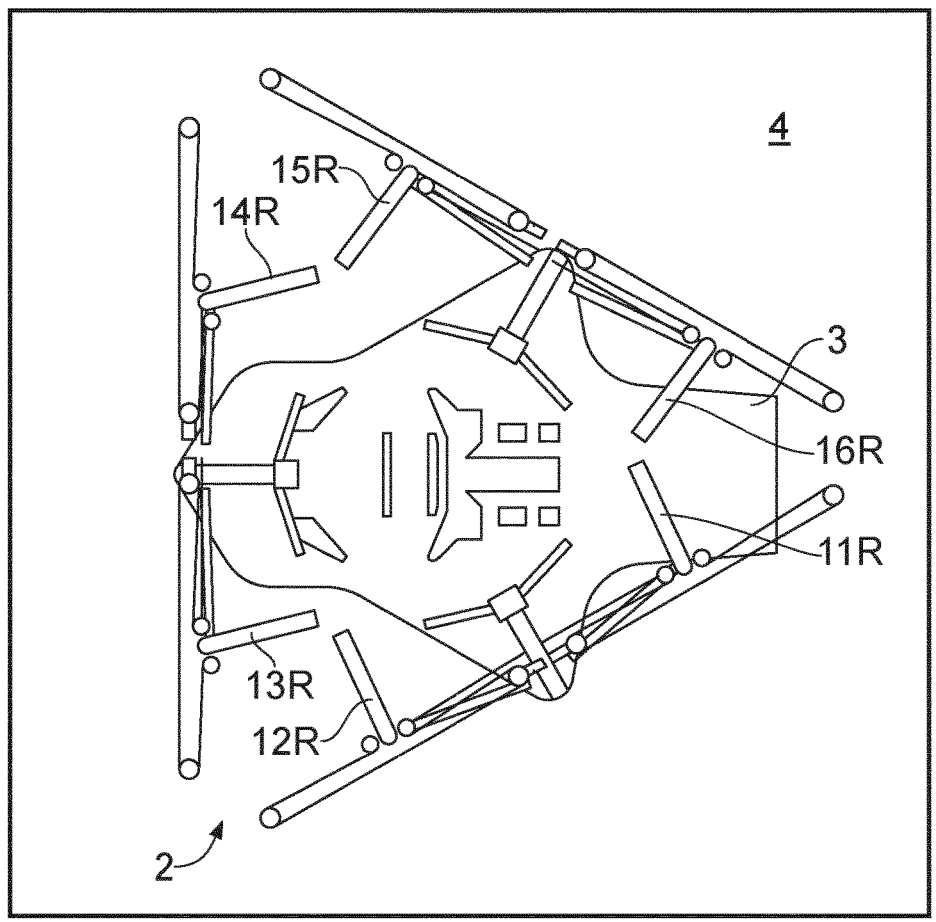
FIG. 11 is a plan view from below of the motion system in the sway left condition of FIG. 10.

The motion generator is shown with the chassis 3 in a sway left condition in FIG. 10 and FIG. 11. In this condition, the position of the rockers is as follows:

| Rockers | Position from below |
|---|---|
| 11R | CLOCKWISE |
| 12R | CLOCKWISE |
| 13R | ANTI-CLOCKWISE |
| 14R | ANTI-CLOCKWISE |
| 15R | CLOCKWISE |
| 16R | CLOCKWISE |

Figure 12:
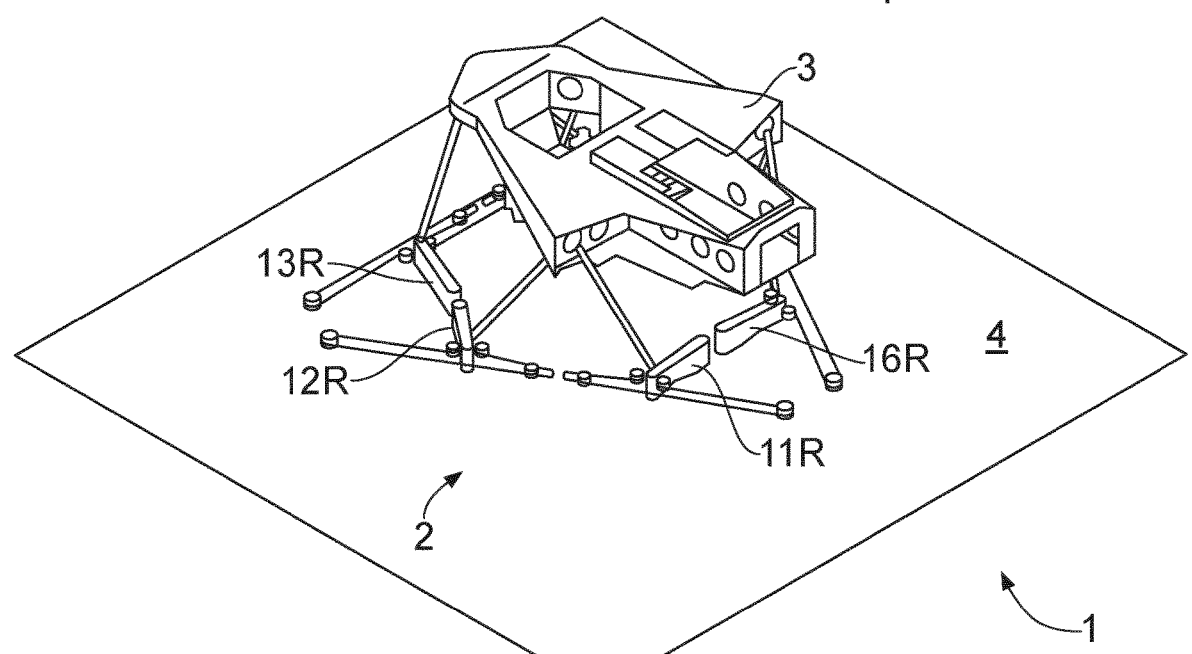
FIG. 12 is a perspective view of the motion system as shown in FIG. 2 in a heave up condition.
Figure 13:
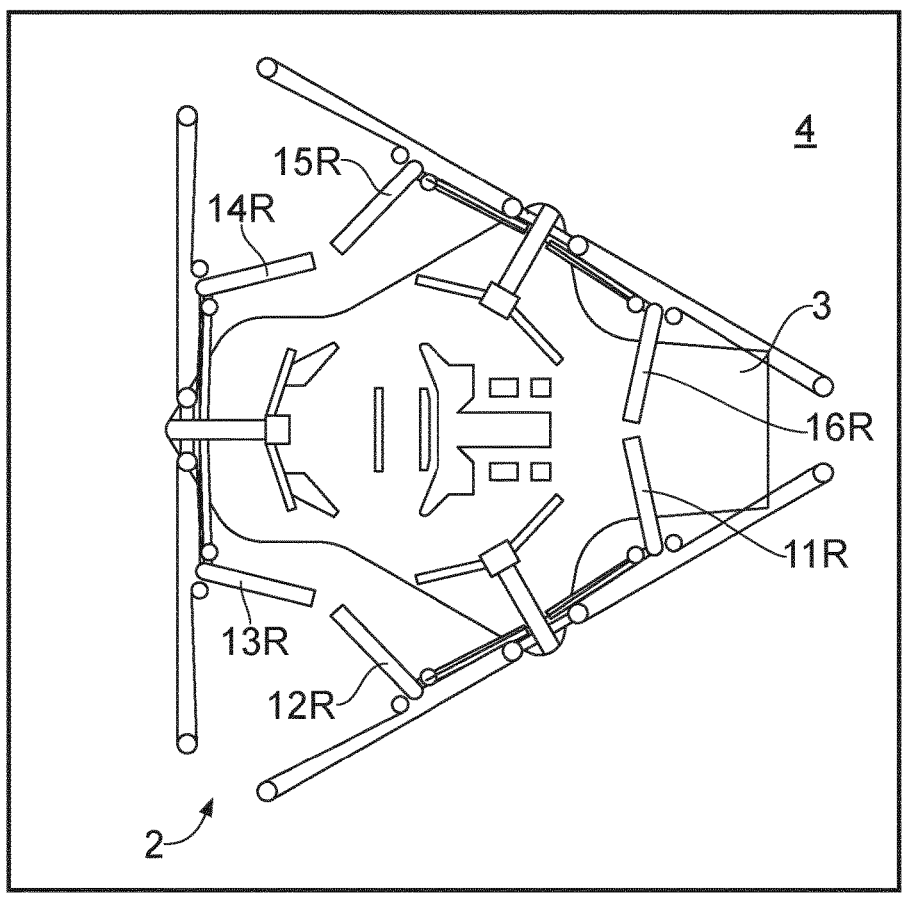
FIG. 13 is a plan view from below of the motion system in the heave up condition of FIG. 12.

The motion generator is shown with the chassis 3 in a heave up condition in FIG. 12 and FIG. 13. In this condition, the position of the rockers is as follows:

| Rocker | Position (from below) |
|---|---|
| 11R | CLOCKWISE |
| 12R | ANTI-CLOCKWISE |
| 13R | CLOCKWISE |
| 14R | ANTI-CLOCKWISE |
| 15R | CLOCKWISE |
| 16R | ANTI-CLOCKWISE |

Figure 14:
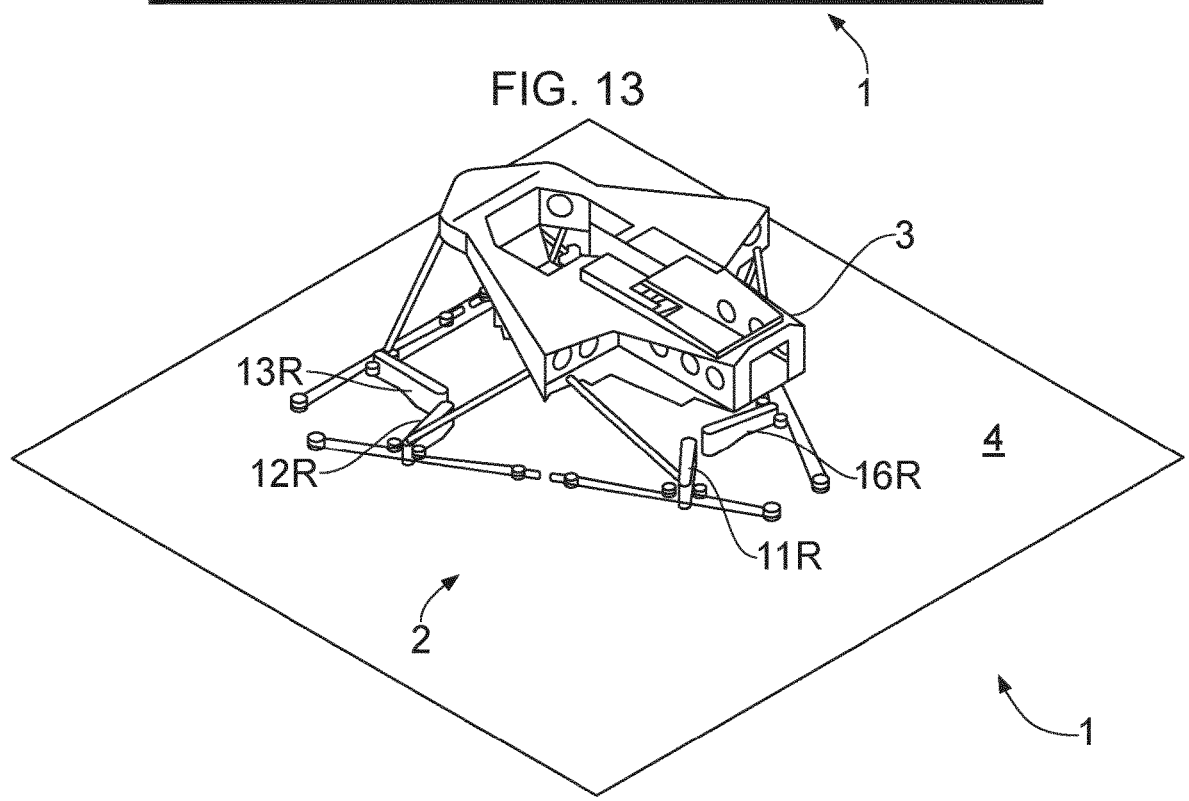
FIG. 14 is a perspective view of the motion system as shown in FIG. 2 in a roll right side down condition.
Figure 15:
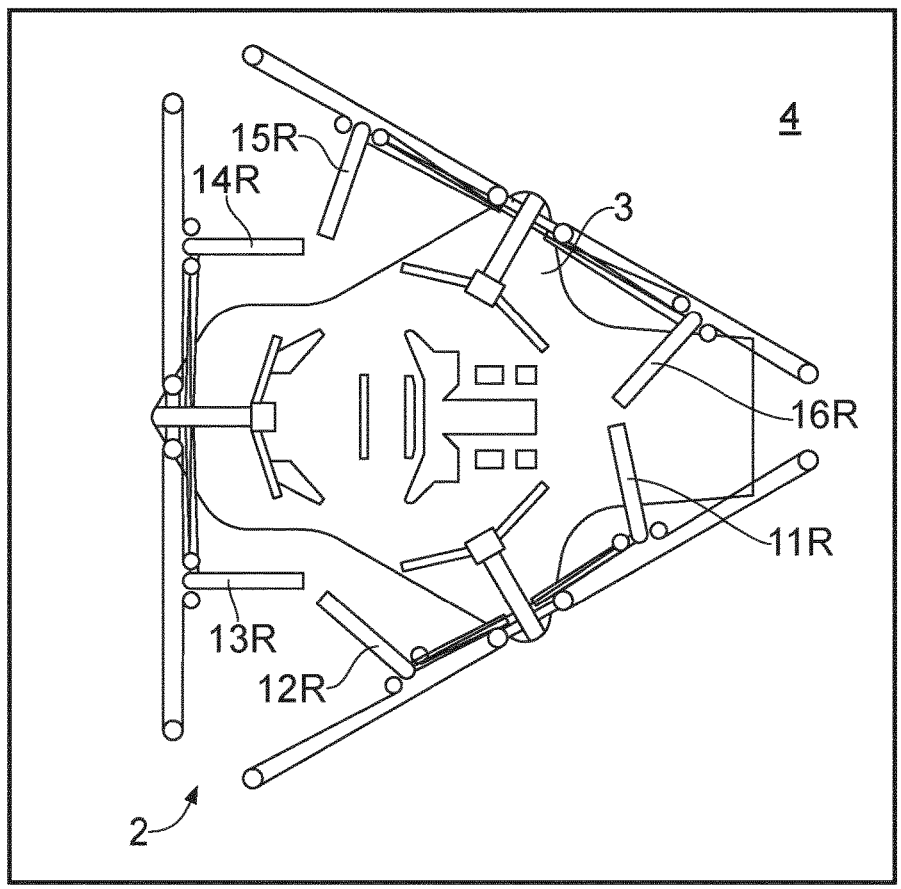
FIG. 15 is a plan view from below of the motion system as shown in FIG. 14 in the roll right side down condition.

The motion generator is shown with the chassis 3 in a roll right side down condition in FIG. 14 and FIG. 15. In this condition, the position of the rockers is as follows:

| Rocker | Position (from below) |
|---|---|
| 11R | CLOCKWISE |
| 12R | ANTI-CLOCKWISE |
| 13R | Neutral |
| 14R | Neutral |
| 15R | ANTI-CLOCKWISE |
| 16R | CLOCKWISE |

Figure 16:
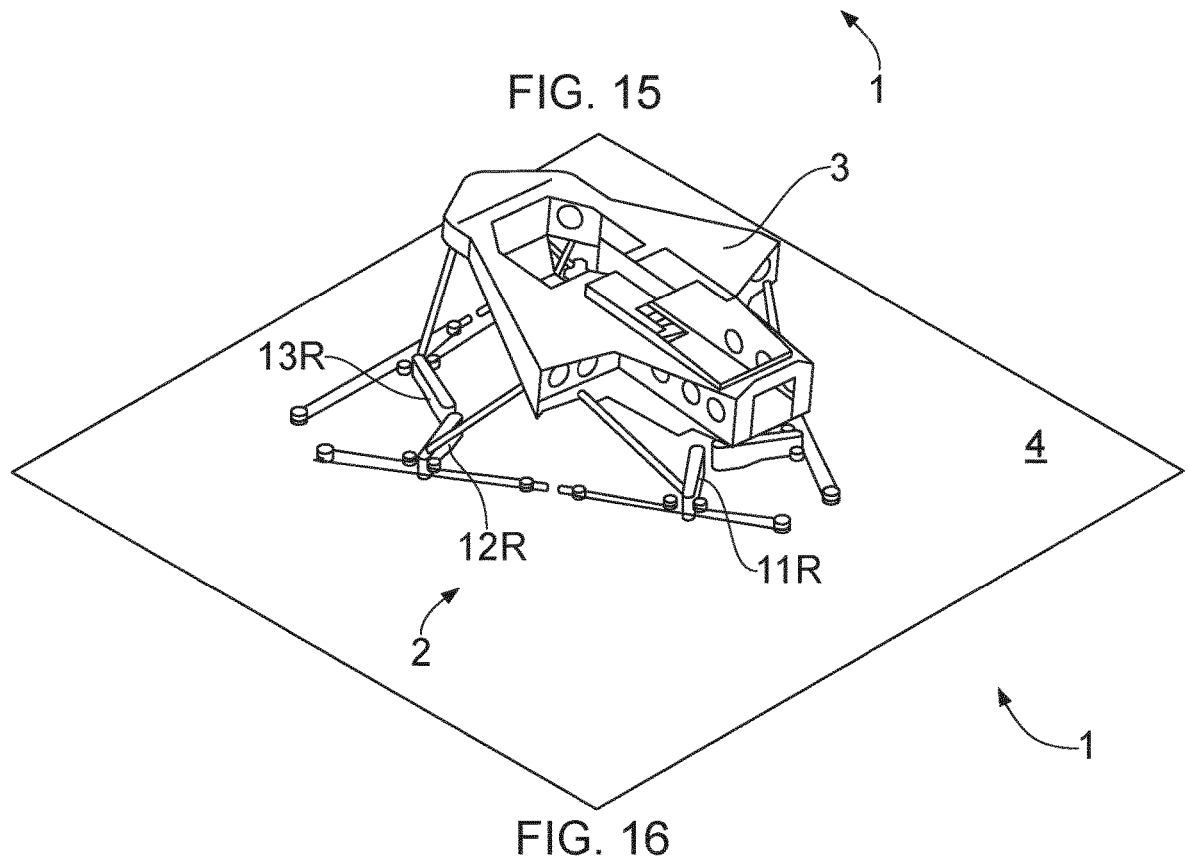
FIG. 16 is a perspective view of the motion system as shown in FIG. 2 in a pitch nose down condition.
Figure 17:
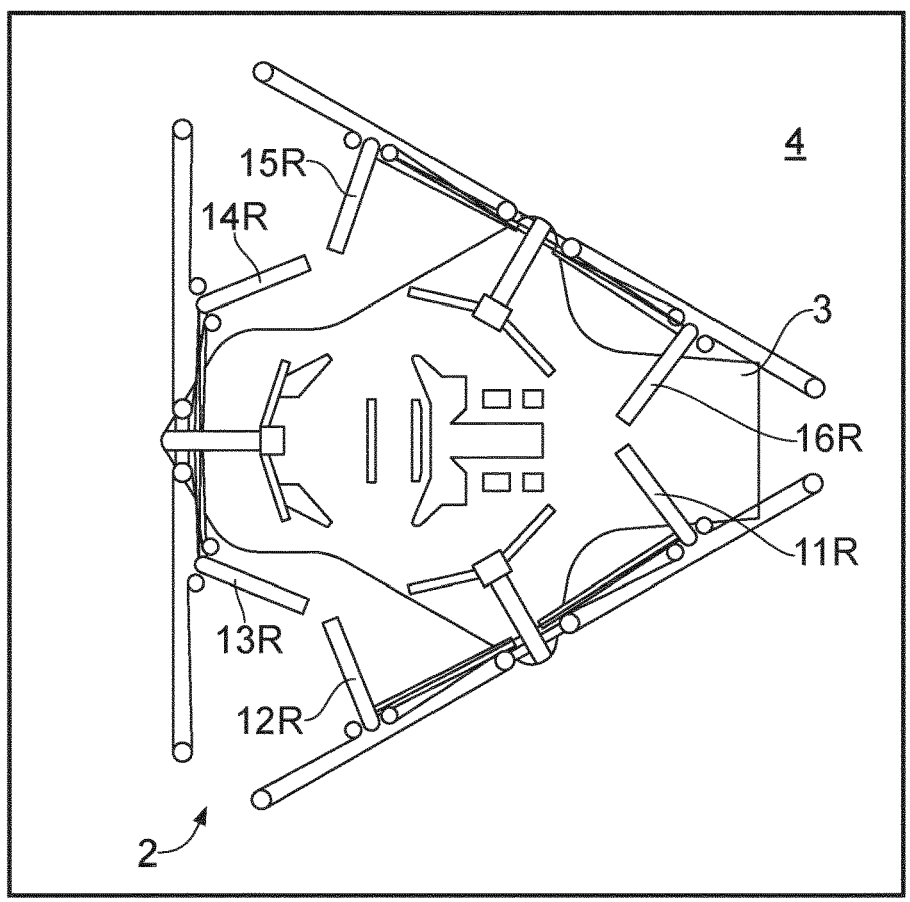
FIG. 17 is a plan view from below of the motion system in the pitch nose down condition of FIG. 16.

The motion generator is shown with the chassis 3 in a pitch nose down condition in FIG. 16 and FIG. 17. In this condition, the position of the rockers is as follows:

| Rocker | Position (from below) |
| --- | --- |
| 11R | ANTI-CLOCKWISE |
| 12R | CLOCKWISE |
| 13R | CLOCKWISE |
| 14R | ANTI-CLOCKWISE |
| 15R | ANTI-CLOCKWISE |
| 16R | CLOCKWISE |

Figure 18:
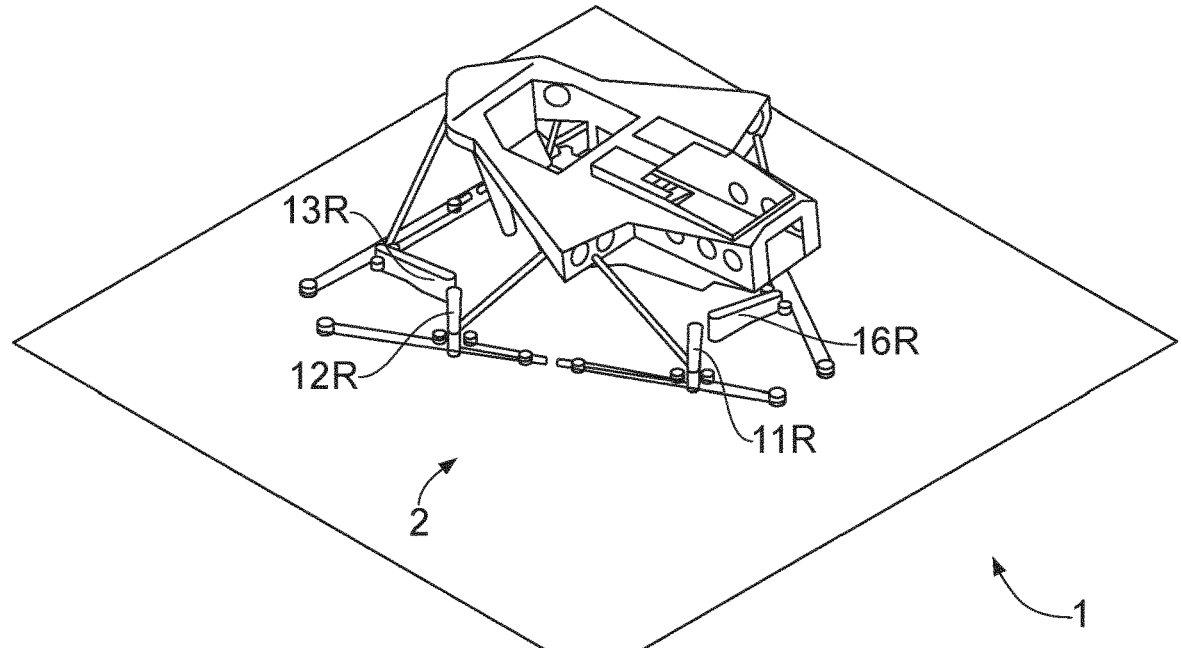
FIG. 18 is a perspective view of the motion system as shown in FIG. 1 in a yaw nose left condition.
Figure 19:
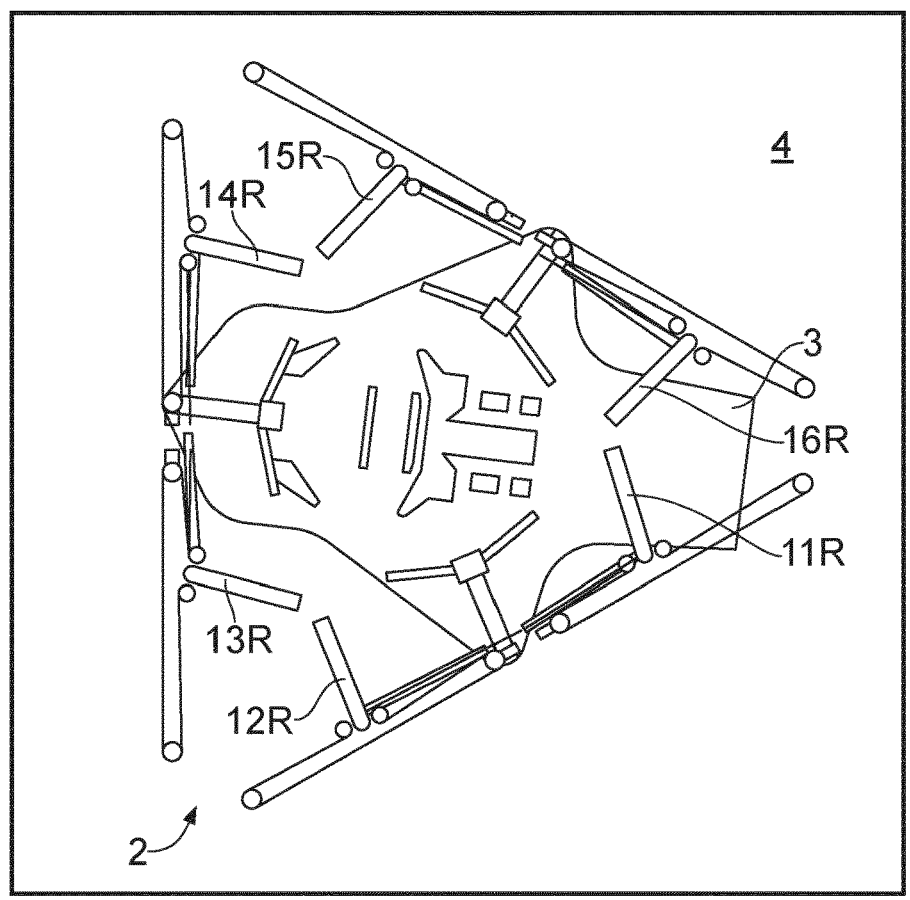
FIG. 19 is a plan view from below of the motion system in the yaw nose left condition shown in FIG. 18.

The motion generator is shown with the chassis 3 in a yaw nose left condition in FIG. 18 and FIG. 19. In this condition, the position of the rockers is as follows:

| Rocker | Position (from below) |
| --- | --- |
| 11R | CLOCKWISE |
| 12R | CLOCKWISE |
| 13R | CLOCKWISE |
| 14R | CLOCKWISE |
| 15R | CLOCKWISE |
| 16R | CLOCKWISE |

It will be noted that only a limited number of conditions is described above in relation to the motion generator 2. It will be appreciated by the skilled addressee that the motion generator 2 may be operated into many more conditions including, and not exclusively surge rearward, sway right, heave down, roll left side down, pitch nose up and yaw nose right. Furthermore, it will also be appreciated by the skilled addressee that the motion generator 2 may be operated into multiple combinations of such conditions. For example, the motion generator may be operated into a combined heave up and yaw nose left condition. The motion generator has the advantages of the invention including high bandwidth, low friction and low inertia which increase the accuracy of the movements of the payload, chassis 3.

Control System

Figure 26:
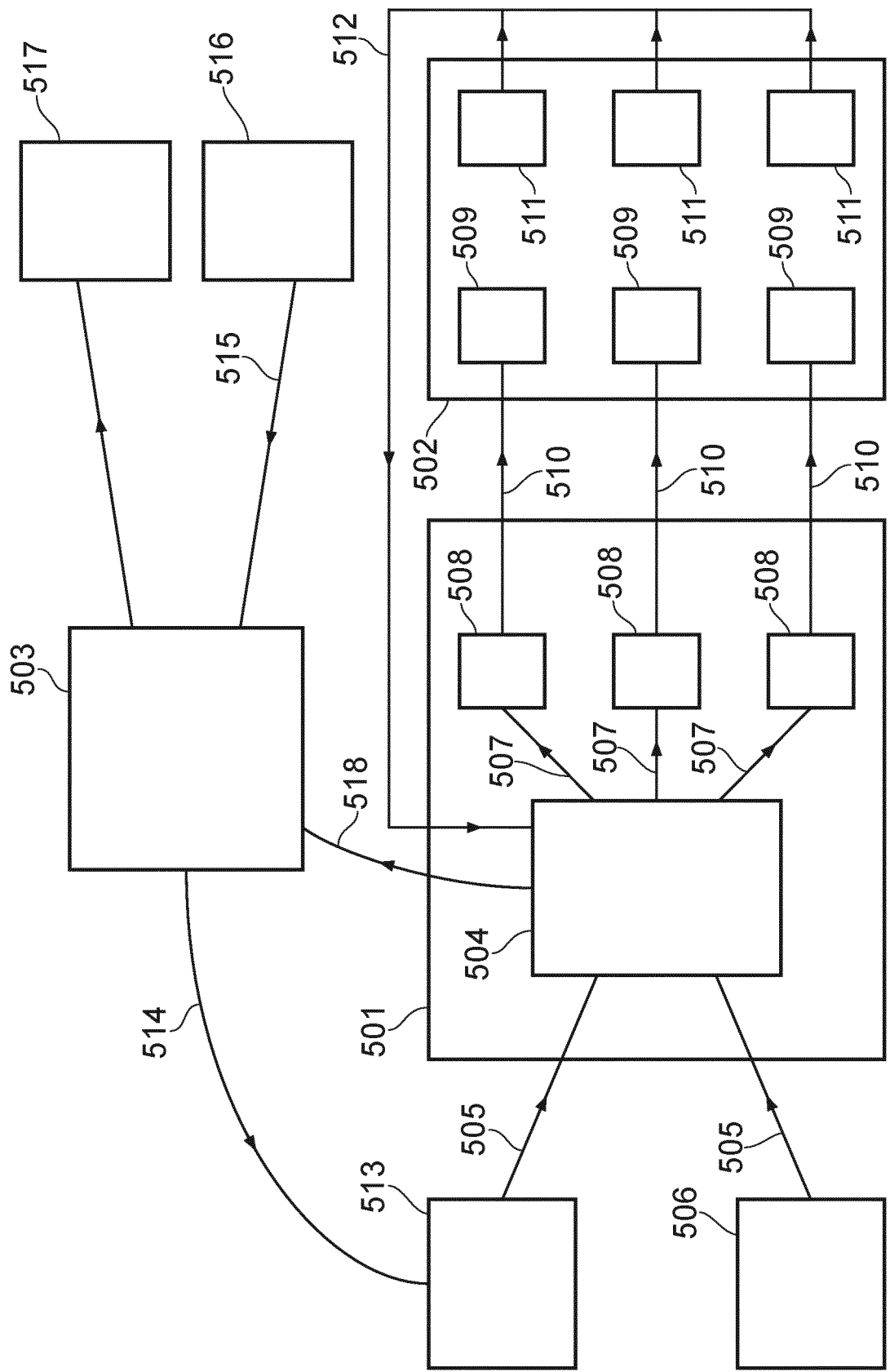
FIG. 26 is a schematic view of a control system for use with motion generators of the invention.

FIG. 26 shows a control system 501 for use in controlling operation of a motion generator in accordance with the invention. In relation to FIG. 26, the motion generator is referred to as 502, but the control system 501 is applicable to the other motion generators, motion systems, and motion simulators described herein. The control system 501 comprises a motion controller 504 which executes a computer program, preferably in a deterministic or real time manner, and which takes motion demand inputs 505 from a demand generator such as a simulation environment 503 or a set point generator 506. The motion controller computes the positions, accelerations and/or forces 507 required to be produced at each actuator 509 to in order to generate the demanded motion profile 505. The control system 501 also comprises servo drives 508 which provide precisely controlled electrical currents 510 to drive the actuators 509.

In operation, the motion controller sends to each servo drive 508 a demanded position or force 507. The actuator 509 has a motion measurement device 511, such as an encoder, which provides motion feedback 512 to the motion controller, optionally via the servo drive. The motion controller compares the demanded motion profile 505 to the one measured 512 and updates the actuator demand 507 accordingly.

FIG. 26 also shows the control system with a simulation environment 503, such as a driving simulation in which the physics of a simulated vehicle and its environment, such as a racetrack or city roads, are computed. In this embodiment the control system 501 receives motion demands from the simulation environment 503, which represent the motion of a virtual vehicle. The computer program determines the motion of the vehicle in a virtual world 514, then applies a motion cueing algorithm 513 (MCA, also known as washout filters) to transform the simulated vehicle motions into those that can be represented by the motion generator. These calculated motions are then provided to the control system as motion demands 505. The MCA 513 could be part of the simulation environment 503 or the control system 501 or separate to both. The simulation environment 503 may receive inputs signals 515 from control devices 516 such as steering, throttle or brake inputs, which an operator, I.e. a human user such as a driver, passenger or pilot uses to control the virtual vehicle in the simulation environment. The operator would likely be a passenger on the motion generator 502. These inputs 515 may be passed back to the simulation environment via the control system or directly. The simulation environment is also likely to produce an output on a visual display 517 for the driver, passenger, or other user or operator. The simulation environment may also require additional data 518 from the control system, such as relating to the position of the motion generator, or control device inputs signals.

Combination of Motion Generators

Figure 27A:
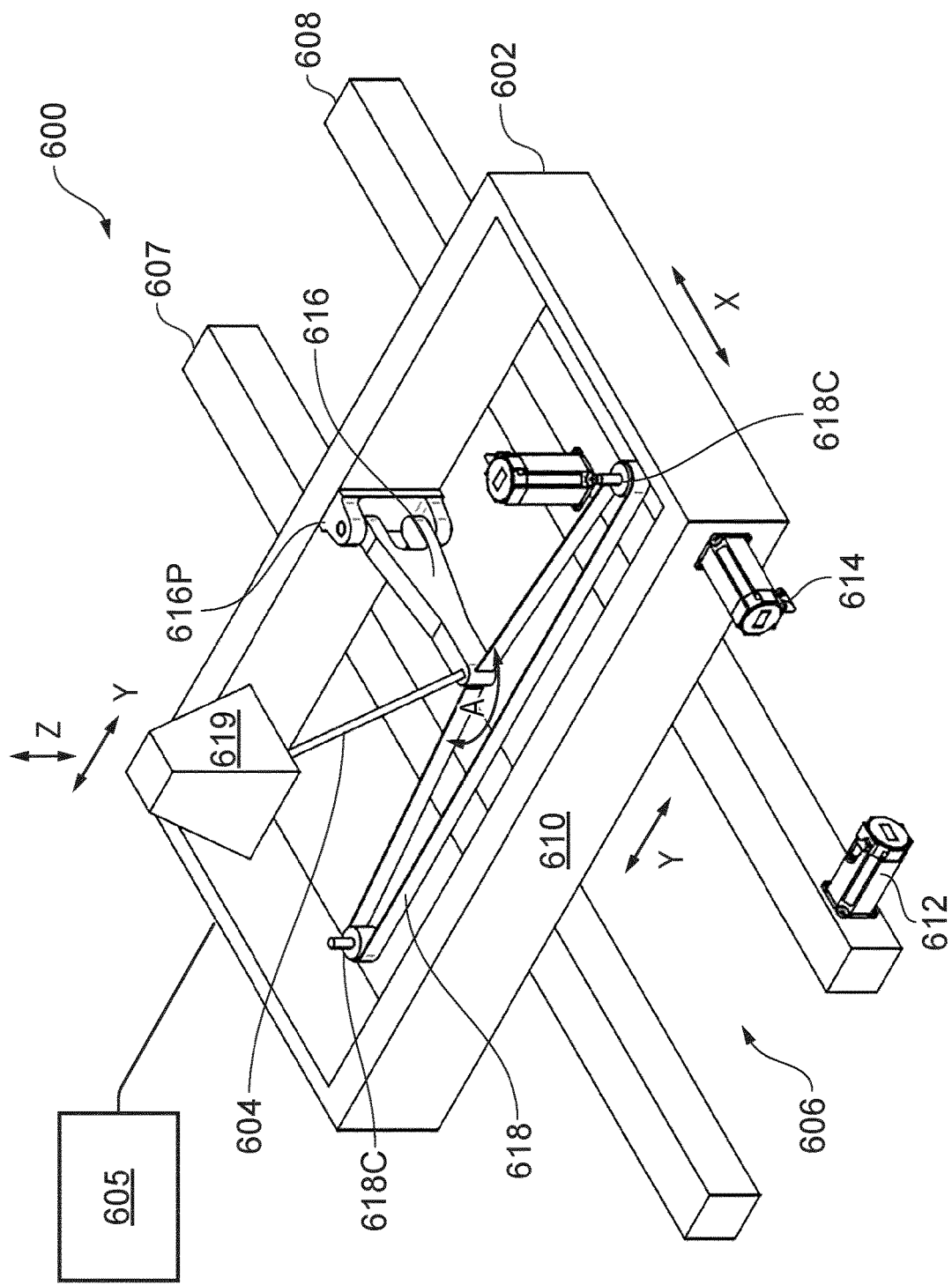
FIG. 27A is a schematic view of a combination including a motion generator in accordance with the invention, and another motion generator.

A motion generator in accordance with either aspect of the invention may be used in series with a further motion generator. For example, a motion generator in accordance with the invention may be used as a secondary motion generator, that is to say the motion generator itself becomes the payload of a primary motion generator. FIG. 27A shows a combination 600, which is in accordance with the invention, and comprising a first (or "primary") motion generator 602, and a second (or "secondary") motion generator 604 (which is a motion generator in accordance with the invention). The combination is installed on a planar surface 601 (not shown) typically a building floor. The primary motion generator 602 is a simple X and Y frame arrangement, comprising a lower frame 606, including lower frame members 607, 608, and an upper frame 610. The lower frame member 608 supports a motor 612 which can be operated, under commands from a control system 605 (for example as shown in FIG. 26) to move the frame 610 in the X direction. A similar motor 614 is correspondingly arranged on the frame 610 to move that frame in the Y direction under commands from the control system 605. The secondary motion generator 604, which is a motion generator in accordance with the first aspect of the invention mounted on the primary motion generator 602, comprises a rocker 616 (directly mounted on upper frame 610 of the primary motion generator i.e. it is mounted in a plane above the surface 601) which is drivably connected to an actuator (comprising a motor 617, and elongate belt 618 which is attached to the movable end of the rocker, which passes around capstans 618CA), and to an elongate rigid strut 620. The elongate strut 620 is connected by a joint at one end to the free end of the associated rocker 616 and at its other end by a joint to an end effector supporting payload 619. When the motor 617 is operated under commands from the control system, it drives a driven capstans 618CA and in turn the belt 618 to move the associated rocker 616. The rocker 616 pivots about a vertical pivot axis (passing though rocker pivot 616P), with the rocker arm describing a horizontal arc (shown as A). The movement of rocker 616 moves the associated strut 620 to move the end effector/payload 618/619 in the X and Y directions, as well permitting yaw, heave and pitch motions. The combination 600 is advantageous in that the primary motion generator 602 is relatively inexpensive but provides good excursion ranges in the X and Y directions and the secondary motion generator 604 provides a higher bandwidth and lower levels of inertia and friction which increase the accuracy of the movements imparted to the payload.

Combination of Motion Generators

Figure 27B:
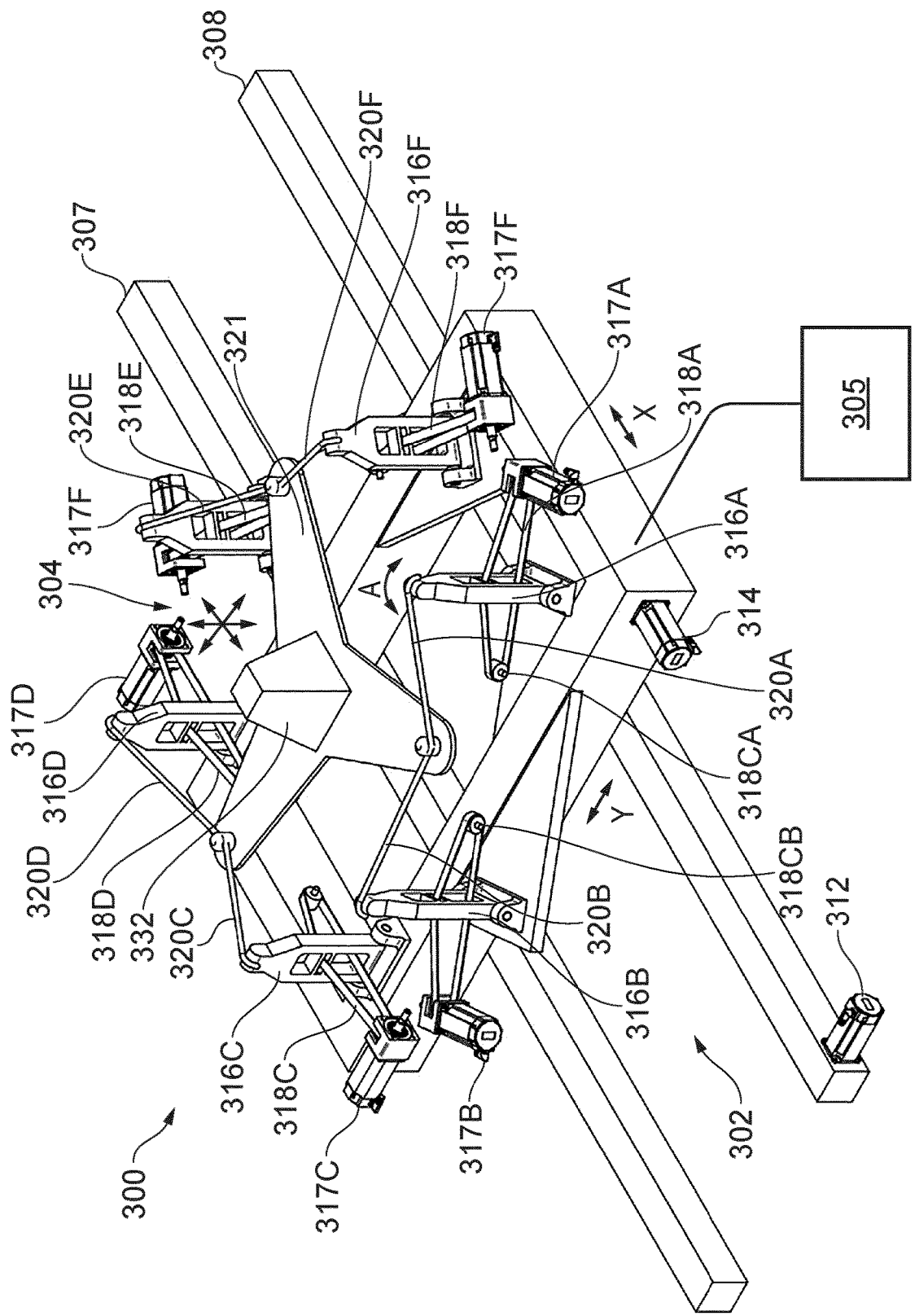
FIG. 27B is a schematic view of another combination including a motion generator in accordance with the invention, and another motion generator.

FIG. 27B shows another combination 300 in accordance with the invention, comprising a first (or "primary") motion generator 302, and a second (or "secondary") motion generator 304 (which is a motion generator in accordance with the invention). The combination 300 is installed on a planar surface 301 such as a floor in a driving simulator building. The primary motion generator 302 is a simple X and Y frame arrangement, generally as described above in relation to primary motion generator 602, comprising a lower frame 306, including lower frame members 307, 308, and an upper frame 310. The lower frame member 308 supports a motor 312 which can be operated, under commands from a control system 305 (for example as shown in FIG. 26) to move the frame 310 in the X direction. A similar motor 314 is correspondingly arranged on the frame 310 to move that frame in the Y direction under commands from the control system. The secondary motion generator 304 which is a motion generator in accordance with the second aspect of the invention, comprises six rockers 316A-F, each rocker being drivably connected to an actuator (comprising motors 317A-F and associated elongate toothed belts 318A-F which pass around a correspondingly splined capstan of the associated motor 317A-F and a free-moving capstan e.g. 318CA or 318CB), generally as described in relation to the FIG. 1 motion generator, and to an elongate rigid strut (struts 320A-F). Each of the elongate rigid struts 320A-F is connected by a joint at one end to the free end of the associated rocker 316A-F and at its other end by a joint to an end effector (platform 321 supporting payload 3322. It will be noted that the rockers 316A-F are mounted on the upper frame 310 of the primary motion generator 302 in a plane defined by the upper surface of that frame 310 which is spaced above the surface 301. When a motor 317A-F is operated under commands from the control system, it drives an associated belt 318A-F so that the associated rocker 316A-F pivots about a horizontal pivot axis with the rocker arm describing an arc (for example as shown as A for rocker 316A). The movement of a rocker 316A-F therefore moves the associated strut 320A-F to move the end effector/payload 318/319 in the X and Y directions, as well permitting yaw, heave and pitch motions. The combination 300 is advantageous in that the primary motion generator 302 is relatively inexpensive but provides good excursion ranges in the X and Y directions and the secondary motion generator 304 provides a higher bandwidth and lower levels of inertia and friction which increase the accuracy of the movements of the payload.

Driving Simulator

Figure 20:
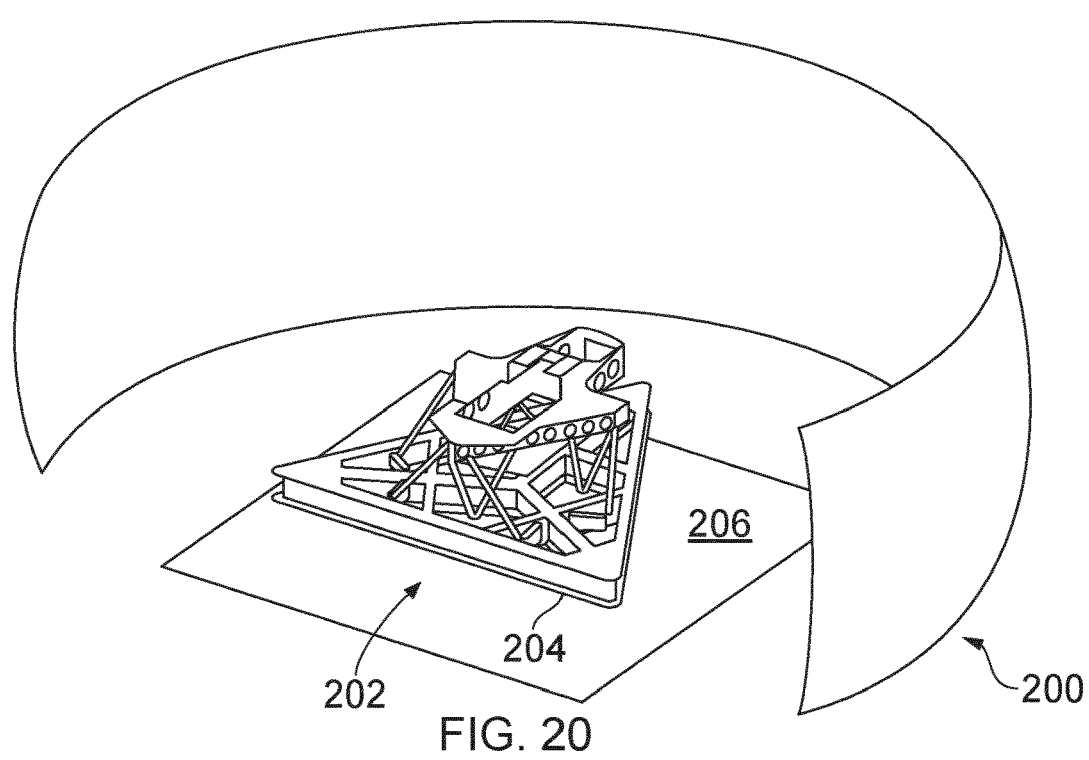
FIG. 20 is a perspective view of a driving simulator in accordance with the invention.

A driving simulator 200 in accordance with the invention is shown in FIG. 20. The driving simulator 200 comprises a motion system 202 including a motion generator 204 in accordance with the invention, for example as described above in relation to FIGS. 1 to 19 or below in relation to FIGS. 21-23, or a combination as described in relation to FIG. 27B. The motion system 202 mounted on a surface 206 in front of a projection system 206 on which can be displayed images of a driving environment, the projection system constituting an example of an environment simulation means. An audio system (not shown) provides sound to the user replicating the sounds of a driving environment, constituting another example of an environment simulation means. The motion generator 204 of the driving simulator 200 is operated under the command of a control system 207 (for example, as described in relation to FIG. 26).

A motion generator in accordance with the invention, as described in several embodiments above, which is suitable for use as used in a driving simulator as described in this embodiment may be advantageous in some or all of several respects compared with known motion generators for such applications. First, it may have low levels of friction within its moving parts owing to a) the use of revolute joints or rotary bearings rather than linear bearings for reacting weight and inertial loads b) dispensing with recirculating ball screw linear actuators. Second, it may have low inertia particularly where rotary motors rather than linear motors are used, particularly linear actuators that move in their entirety with a strut in a mechanism. Where a linear motor is used as an actuator in a motion generator according to this invention, only its forcer need move while its stator or magnetway can remain stationary. Third, it may have high bandwidth typically better than 50 Hz, in more than one degree of freedom. In some embodiments it may have significantly higher bandwidth than 50 Hz, for example 80, 90, 100 or more Hz. It will also be appreciated that the motion generator 204 used in the driving simulator 200 may be especially compact in the vertical direction. This better replicates the height of a vehicle being simulated, in comparison with other motion systems requiring ramps/bridges for a user to enter/exit the driving simulator.

Motion System Including a Motion Generator

Figure 21:
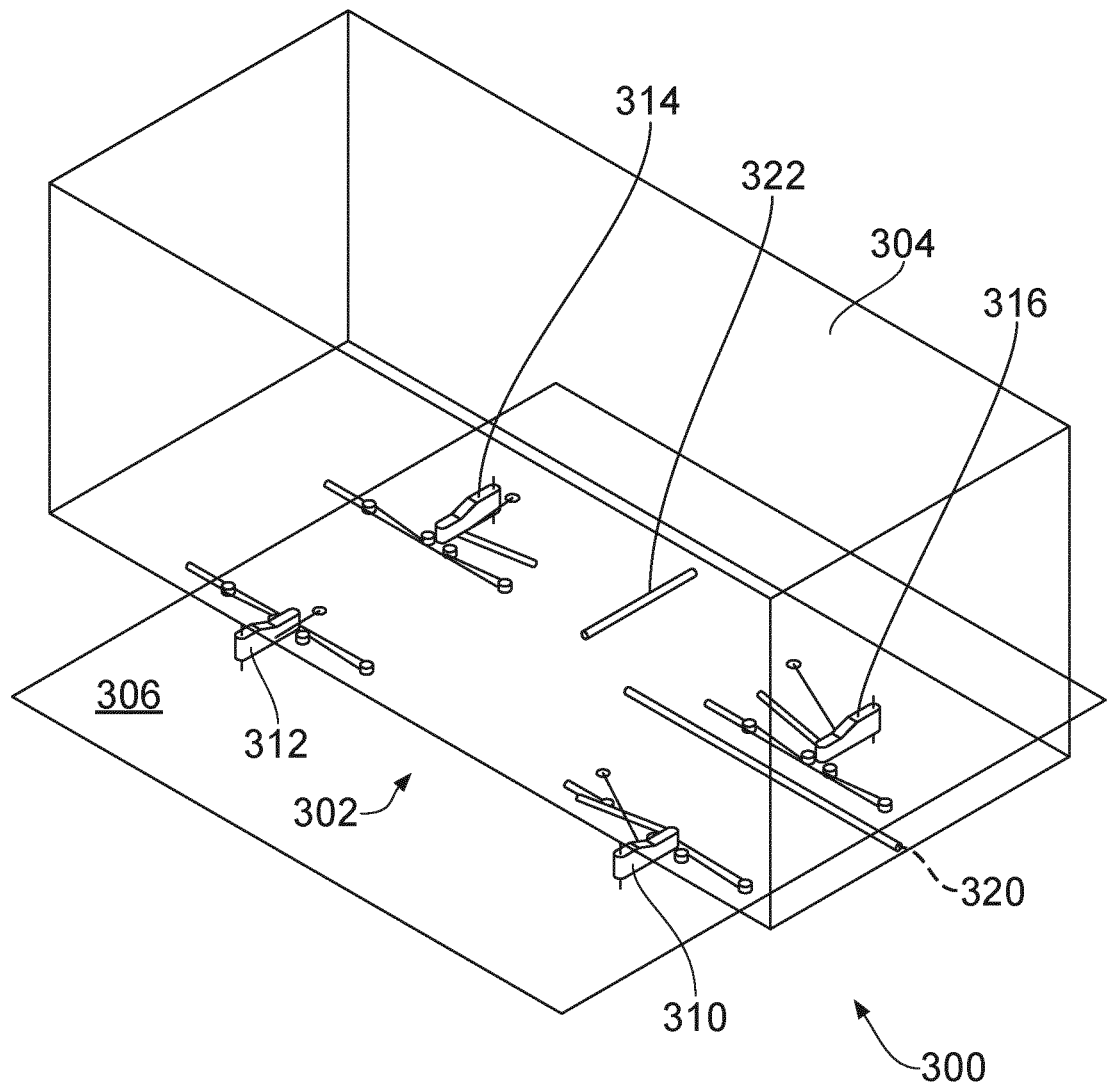
FIG. 21 is a schematic perspective view of another motion system in accordance with the invention.

Another motion system 700 in accordance with the invention is shown in FIG. 21. The motion system 700 includes a motion generator 702 in accordance with the invention which supports a payload 704 above a surface 706. The motion generator 702 comprises four rocker systems 710, 712, 714 and 716 (rocker systems 714 and 716 being obscured in FIG. 21) which are generally as described above. Linear constraints 720 and 722 are arranged at right angles between rocker arrangements 710, 716 and 716, 714 respectively. The motion system 700 also includes a control system (for example as described in relation to FIG. 26).

In use, the rockers 710-714 are moved by belt drives B, generally as described above so that elongate struts interposed between the rockers and the payload 704 (again generally as described above) move the payload in four degrees of freedom with high bandwidth. The constraints 720, 722 prevent excessive movement of the payload 704 in the fore and aft and side to side directions respectively.

It will be appreciated by the skilled addressee that the motion system 700 may be relatively simple yet offer good performance in terms of bandwidth. The system could have a bandwidth in excess of 50 Hz or even 100 Hz in all degrees of freedom, despite having a lower bandwidth primary motion generator, because the secondary motion generator is highly performing in this regard.

Further Motion Generator

Figure 22:
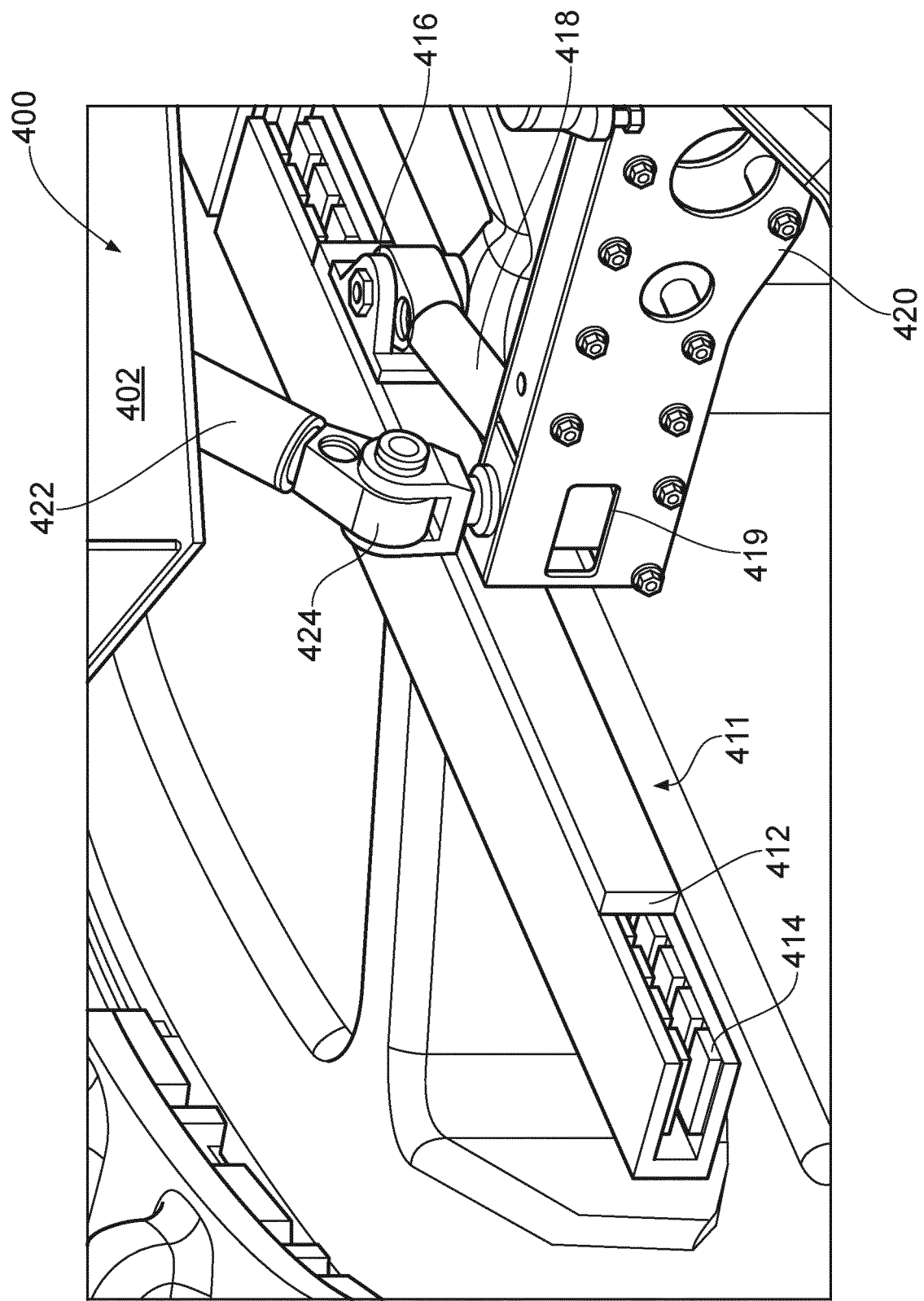
FIG. 22 is a perspective detail view of another motion generator in accordance with the invention.
Figure 23:
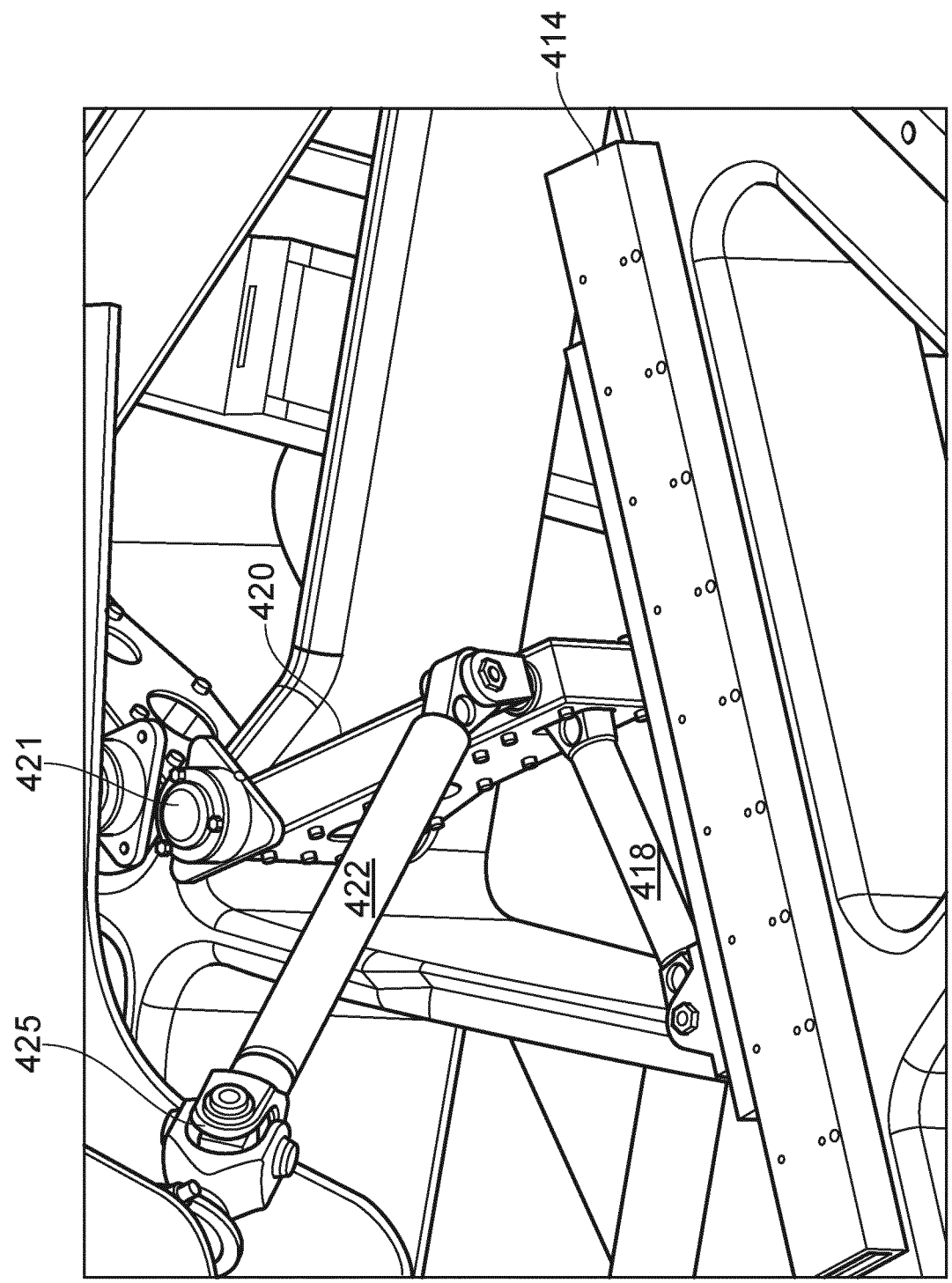
FIG. 23 is a further detail view of the motion generator of FIG. 22.

A further motion generator 400 in accordance with the invention is shown in FIGS. 22 and 23. The motion generator 400, which is constructed and arranged generally as described above in relation to the motion generator 2 shown in FIGS. 1 to 19, except that the six belt-drive linear actuators 11LA-16 LA are replaced by six linear motors and six linkages which drive corresponding rockers and struts to move a platform 402, which constitutes an effector. The six linear motors are operable to move a platform 402 in six degrees of freedom. FIGS. 22 and 23 show one of the six linear motors 411 in more detail. More specifically, FIG. 22 shows the coil 412 and magnetway 414 of linear motor 411. The linear motor 411 is pivotally connected by pivot 416 to an elongate lower strut 418. A further pivot 419 connects the strut 418 to a rocker 420. The rocker 420 is mounted for horizontal pivotal movement on pivot 421 above and parallel with a surface on which the motion generator 400 is mounted. An upper strut 422 is connected by its lower end to the rocker 420 by a clevis joint 424. The upper strut 422 is, in turn, pivotally connected at its upper end by a further clevis joint 425 (shown in FIG. 23) to the platform 402 (omitted for clarity in FIG. 23). In use, linear movement of the coil (e.g. 412) under operation of the linear motor (e.g. 411) as controlled by a control system (for example, as described in relation to FIG. 26) moves the associated rocker (e.g. 420) and connected struts (e.g. 418, 422) to move the platform (402) in six degrees of freedom.

Alternative Rocker Arrangement

Figure 24:
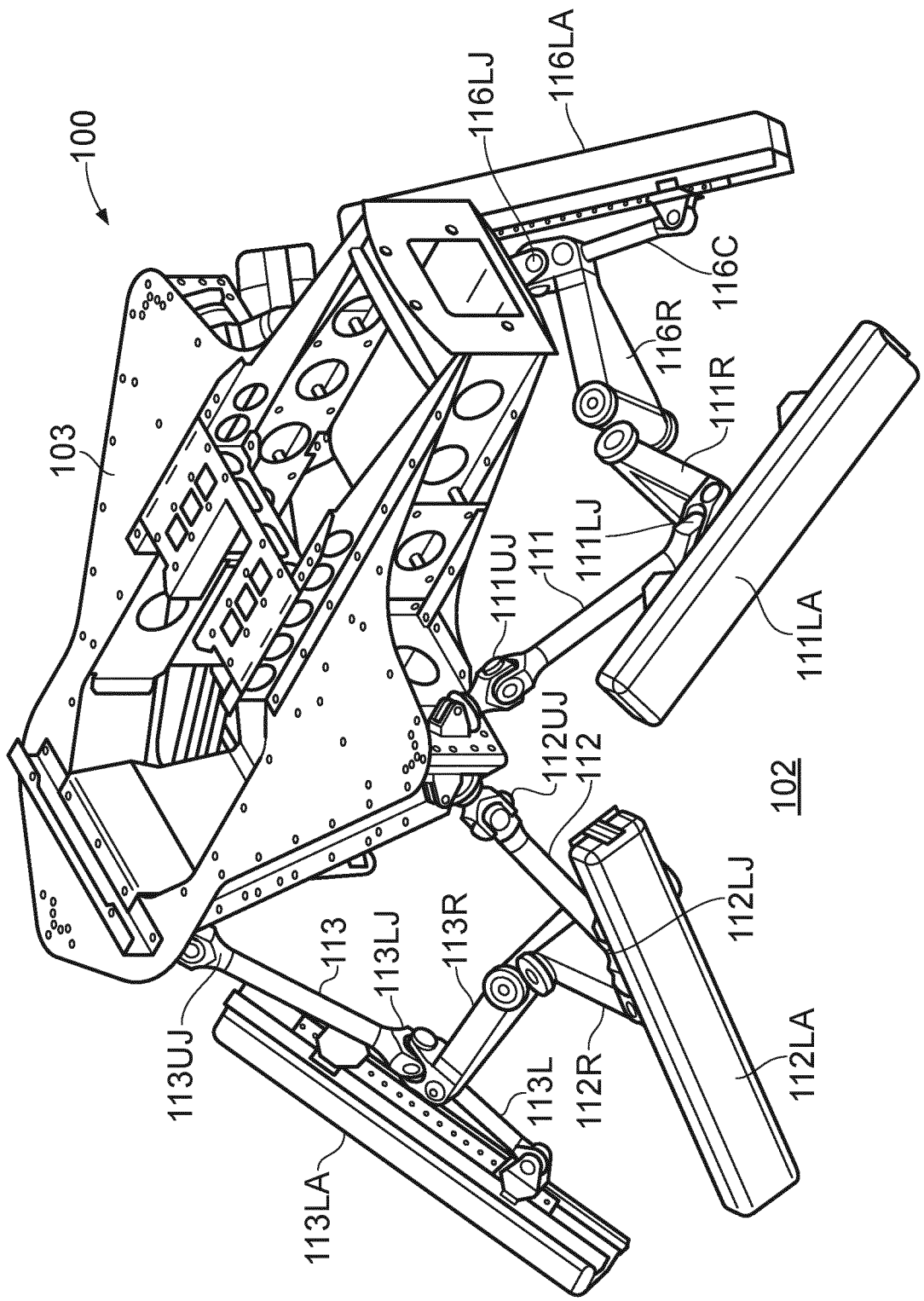
FIG. 24 is a partial view of another motion generator showing an alternative rocker arrangement.
Figure 25:
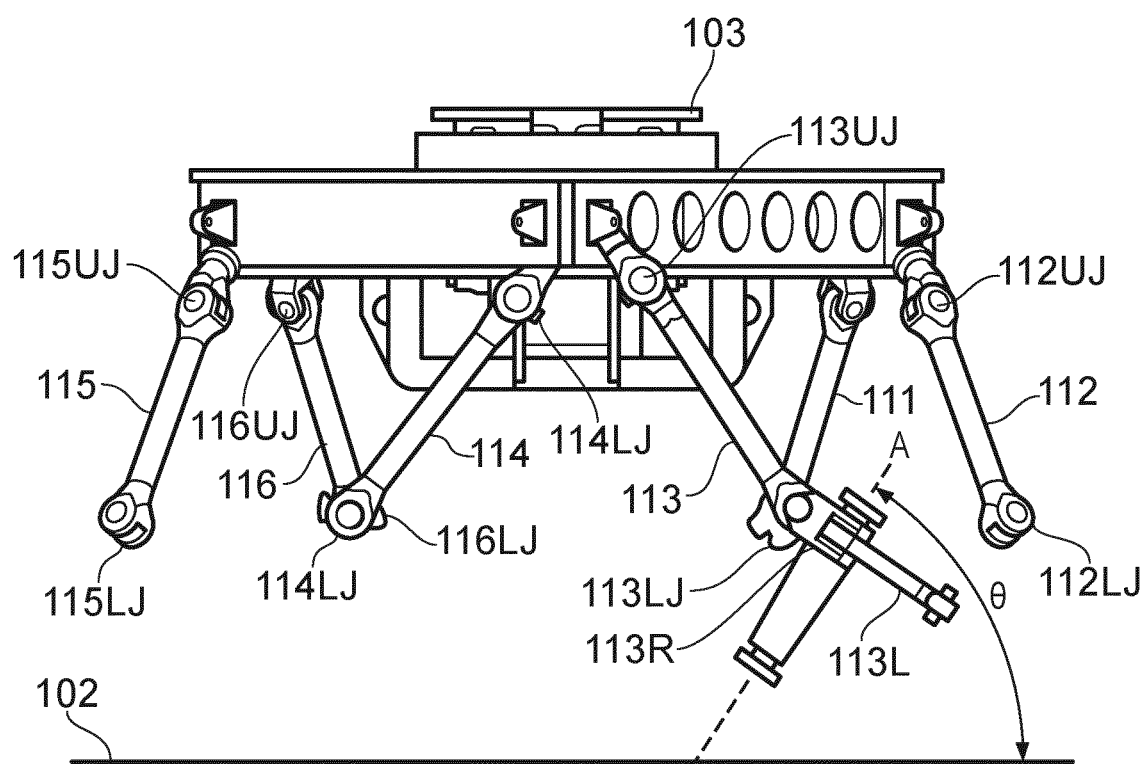
FIG. 25 is a further partial rear view of the motion generator of FIG. 24 showing the inclination of a rocker arrangement.

An alternative rocker arrangement is shown schematically in FIGS. 24 to 25. In this embodiment, a motion generator 100 is mounted on a planar surface generally indicated as 102, and supports a chassis 103, which constitutes the payload of the motion generator 102, and control means (not shown) above a triangular frame 105 (omitted for clarity). The chassis 103, which is constructed of a lightweight rigid material such as aluminium, or carbon fibre, is a replica of a racing car cockpit. The chassis 103 is supported by pairs of elongate rigid rods or struts, 111, 112; 113, 114; and 115, 116 which are connected at their upper ends by upper joints 111 UJ, 112 UJ, 113 UJ, 114 UJ, 115 UJ, and 116 UJ respectively to the chassis 103. The elongate rigid rods 111-116 may be made, for example, of carbon fibre to reduce resonance. The upper joints 111UJ-16UJ may be spherical, cardan, or universal joints, and/or may comprise flexures. The lower end of each elongate rod 111-116 is connected by a lower joint 111LJ, 112LJ, 113LJ, 114LJ, 115LJ, and 116LJ (which may also be spherical, cardan or universal joints and/or may comprise flexures) respectively to rockers 111R, 112R, 113R, 114R, 115R, and 116R, respectively which are arranged for pivotal movement on the inside of the triangular frame 105 of the motion generator 100, being driven by linkages 111L, 112L; 113L, 114L; and 115L, 116L connected to linear actuators 111LA, 112 LA; 113 LA, 114 LA; and 115LA, 116 LA.

In contrast with previous embodiments, where the rockers move parallel with the surface on which the motion generator is mounted, as the pivot axis for each rocker is perpendicular to the surface, the rockers 111R, 112R, 113R, 114R, 115R, and 116R are arranged for angled pivoting movement which is non-parallel with the surface (in this case 102) on which the motion generator is mounted. In this description, the opposite end of the rocker to the pivot axis is termed the free end. In this embodiment, the rockers are inclined at 45° from the surface (The angle indicated as Θ, between the surface 102 and the axis A around which the rocker 113R pivots is shown in FIG. 25). In other embodiments, the pivot rockers may be inclined at 0 to 45° from the surface. Where the surface on which the motion generator is mounted is not planar, the angle of inclination of the rockers is taken from a datum line. Where the motion generator is arranged in a combination as a secondary motion generator, the angle of inclination of the rockers may be taken from a plane defined above the surface, such as by a planar surface of an upper frame of the primary motion generator on which the rockers are mounted. Such a plane may be considered as a "surface". In some situations, such an inclined rocker arrangement is preferable as it may reduce unwanted resonances. An inclined rocker arrangement may also be more compact. It may also reduce loads reacted by bearings thereby further reducing friction.

Further Alternative Rocker Arrangement

Figure 28A:
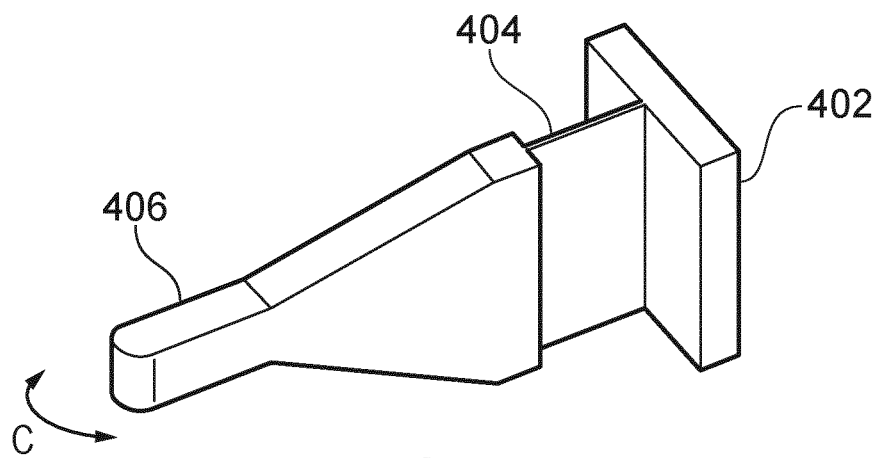
FIG. 28 is a schematic view of an alternative rocker arrangement.
Figure 28B:
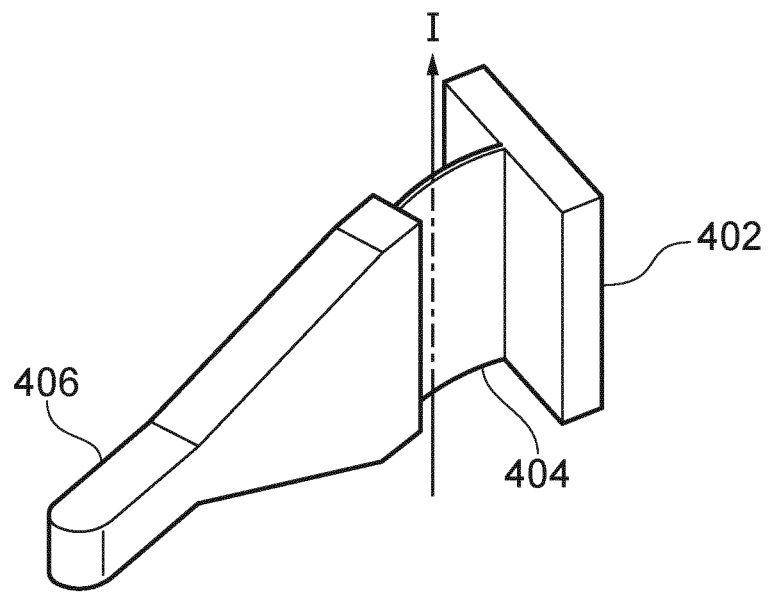

A further alternative rocker arrangement suitable for use in a motion generator in accordance with the invention is illustrated in FIGS. 28 A and B. FIG. 28 A shows a rocker 400 which includes a rocker base 402, connected by a flexure 404, to rocker arm 406. The flexure is formed from a predictable elastic material such as spring steel, tool steel, or a composite such as E-glass or S-glass. The flexure 404 allows an arcing movement ((indicated as arc C) of the rocker arm 406 in a plane perpendicular to the flexure 404 which approximates rotation around an imagined axis in the middle of the flexure 404. The rocker arm 406 is shown in one position on arc C in FIG. 28 B. The imagined axis may be considered as an equivalent to the pivot axis of the other rockers described above. Such a rocker arrangement incorporating a flexure may be advantageous in that it avoids the use of bearings, it may eliminate backlash, and/or provides increased stiffness.

METHODS OF PRODUCING MOTION SYSTEMS

A motion system in accordance with the invention including a motion generator, such as those described above, and control means may be assembled from custom and standard components by conventional means. In particular, a motion system may be produced by connecting a motion generator in accordance with the invention with a control system.

The invention claimed is:

1. A motion generator comprising:
   an effector for applying forces, moments and movements to a payload relative to a surface in four or more degrees of freedom,
   one or more elongate rigid struts, the effector being connected to the one or more elongate rigid struts, each strut being connected at one end thereof by a first joint to the effector,
   one or more rockers associated with the one or more elongate rigid struts, each strut being connected at its other end by a second joint to an associated rocker of the one or more rockers, each of the associated rockers having a pivot axis, such that movement of an associated rocker about the pivot axis leads to movement of the effector, and forces applied to an associated rocker lead to forces being applied to the effector, and
   one or more actuators, in which the movement of an associated rocker and forces applied by the associated rocker are controlled by the one or more actuators, at least one of the one or more actuators being in the form of an elongate belt, cable, rope drive, or linear motor arranged to apply a force to a point on an associated rocker away from the pivot axis of the associated rocker, the pivot axes of each of the associated rockers being fixed relative to one another.

2. The motion generator according to claim 1, in which there are 5 or 6 elongate rigid struts.

3. The motion generator according to claim 1, in which the at least one of the one or more actuators is in the form of an elongate belt, cable, or rope drive having ends, in which one end of the elongate belt, cable or rope drive is connected to an associated rocker and the other end of the elongate belt, cable or rope drive is attached to a passive force application device which maintains tension in the elongate belt, cable or rope.

4. A motion generator comprising:
an effector for applying forces, moments and movements to a payload relative to a surface in four or more degrees of freedom,
four or more elongate rigid struts, the effector being connected to the four or more elongate rigid struts, each strut being connected at one end thereof by a first joint to the effector,
one or more rockers associated with the four or more elongate rigid struts, each strut being connected at its other end by a second joint to an associated rocker, each of the associated rockers having a pivot axis, such that movement of an associated rocker leads to movement of the effector, and forces applied to an associated rocker lead to forces being applied to the effector, and
one or more actuators, in which the movement of an associated rocker and forces applied by the associated rocker are controlled by the one or more actuators, the one or more actuators being arranged to apply a force to a point on an associated rocker away from the pivot axis of the associated rocker, the pivot axes of each of the associated rockers being fixed relative to one another.

5. The motion generator according to claim 4, in which each of the one or more actuators is in the form of an elongate belt, cable, or rope drive, or a linear motor.

6. The motion generator according to claim 4, in which there are six struts arranged in three pairs, each of the struts being connected at one of their respective ends with an associated rocker, and the other respective ends of the paired struts connecting to three mounting points or joints of the effector.

7. The motion generator according to claim 4, in which at least one of the one or more actuators comprises a belt which is attached at at least one end to the associated rocker and applies a force or forces to the associated rocker.

8. The motion generator according to claim 4, in which the first joint and the second joint together have a total number of degrees of freedom which is at least five.

9. The motion generator according to claim 4, in which one of the first or second joints includes a universal, cardan, spherical joint or flexure, while the other of the first or second joints is a spherical joint, or a universal joint or cardan joint or flexure in series with a revolute joint.

10. The motion generator according to claim 4, comprising a plurality of such associated rockers where the pivot axis of the or each associated rocker is fixed relative to the surface.

11. The motion generator according to claim 4, in which the pivot axis of at least one of the associated rockers is inclined relative to the surface or perpendicular relative to the surface.

12. The motion generator according to claim 4, in which at least one of the associated rockers forms an obtuse angle with a connected strut.

13. The motion generator according to claim 4, wherein the motion generator comprising X elongate rigid struts, where X is less than six, and the motion generator comprises at least one mechanical constraint means which constrains Y degrees of freedom of the effector where Y=6−X.

14. The motion generator according to claim 4, wherein at least one actuator of the one or more actuators comprises an elongate belt, cable or rope drive, in which that at least one actuator is actuated by a pulley or capstan.

15. The motion generator according to claim 14, wherein at least one actuator of the one or more actuators includes a belt, cable, or rope drive having ends, in which both the ends of the belt, cable, or rope drive are attached to an associated rocker, forming a closed loop in the belt, cable, or rope between two attachment points on the associated rocker.

16. The motion generator according to claim 15, in which a passive tensioning device including a pulley is applied to the closed loop in the belt, cable, or rope drive to maintain tension in the belt, cable, or rope drive.

17. The motion generator according to claim 4, and wherein the one or more actuators connected to an associated rocker comprises a linkage and a linear motor whereby the linkage connects the associated rocker to the linear motor.

18. The motion generator according to claim 17, in which the linkage is a fixed length elongate strut having a joint at either end selected from revolute joints, spherical joints, universal or cardan joints, and flexures.

19. The motion generator according to claim 4, in which a passive force application device is connected to an associated rocker so as to provide assistance such as static preload or damping to the one or more actuators.

20. The motion generator according to claim 4, in which one or more passive force application devices such as a spring, gas strut, bungee is connected to the effector or the payload so as to provide assistance to the one or more actuators.

21. The motion generator according to claim 4, in which at least one actuator of the one or more actuators is mounted on or to the surface, or is fixed relative to the surface.

22. A combination comprising the motion generator according to claim 4, the motion generator being arranged to operate as a secondary motion generator in series with a primary motion generator.

23. The combination according to claim 22, in which the primary motion generator includes an end effector or payload, and at least one of the associated rockers or the one or more actuators of the secondary motion generator is mounted on or to the end effector or payload of the primary motion generator.

24. The combination according to claim 23, in which the primary motion generator includes a frame and at least one of the rockers of the secondary motion generator is pivotally mounted to the frame of the primary motion generator.

25. The combination according to claim 22, in which the secondary motion generator has six struts.

26. A motion system comprising:
a control system; and
at least one motion generator according to claim 4.

27. A driving simulator comprising:
at least one environment simulation means selected from visual projection or display means, and audio means; and
the motion system of claim 26.

28. A method of producing the motion generator according to claim 4, the method comprising the steps of:
providing the effector suitable for applying forces, moments and movements to a payload relative to a surface in four or more degrees of freedom, the four or more elongate rigid struts, the one or more rockers for association with the four or more elongate rigid struts, and the one or more actuators,
connecting the effector to the four or more elongate rigid struts, including connecting each strut at one end thereof by a first joint to the effector,
connecting the one or more rockers to the four or more elongate rigid struts, including connecting each strut at its other end by a second joint to an associated rocker, each of the associated rockers having a fixed pivot axis, such that movement of an associated rocker leads to movement of the effector, and forces applied to an associated rocker lead to forces being applied to the effector, and arranging the one or more actuators to control the movement of an associated rocker and forces applied by the associated rocker, the one or more actuators being arranged to apply a force to a point on an associated rocker away from the pivot axis of the rocker, the pivot axes of each of the associated rockers being fixed relative to one another.

29. A method of producing the motion system according to claim 26, the method comprising the steps of:

providing the at least one motion generator, providing a control system, and connecting the control system to the at least one motion generator.

30. A motion system comprising:

a control system; and at least one combination according to claim 22.

31. A driving simulator comprising:

at least one environment simulation means selected from visual projection or display means, and audio means; and at least one combination according to claim 22.

* * * * *